US008391599B1

(12) United States Patent
Medina, III

(10) Patent No.: US 8,391,599 B1
(45) Date of Patent: Mar. 5, 2013

(54) SYSTEMS AND METHODS FOR ADAPTIVE BINARIZATION OF AN IMAGE

(75) Inventor: Reynaldo Medina, III, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 995 days.

(21) Appl. No.: 12/253,278

(22) Filed: Oct. 17, 2008

(51) Int. Cl.
G06K 9/00 (2006.01)
G06K 9/34 (2006.01)
G06K 9/38 (2006.01)

(52) U.S. Cl. .................... 382/168; 382/171; 382/172

(58) Field of Classification Search .............. 382/168, 382/172, 171
See application file for complete search history.

(56) References Cited

U.S. PATENT DOCUMENTS

| | | |
|---|---|---|
| 3,005,282 A | 10/1961 | Christiansen |
| 3,341,820 A | 9/1967 | Grillmeier, Jr. et al. |
| 3,576,972 A | 5/1971 | Wood |
| 3,593,913 A | 7/1971 | Bremer |
| 3,620,553 A | 11/1971 | Donovan |
| 3,648,242 A | 3/1972 | Grosbard |
| 3,800,124 A | 3/1974 | Walsh |
| 3,816,943 A | 6/1974 | Henry |
| 4,002,356 A | 1/1977 | Weidmann |
| 4,060,711 A | 11/1977 | Buros |
| 4,070,649 A | 1/1978 | Wright, Jr. et al. |
| 4,128,202 A | 12/1978 | Buros |
| 4,136,471 A | 1/1979 | Austin |
| 4,205,780 A | 6/1980 | Burns |
| 4,264,808 A | 4/1981 | Owens |
| 4,305,216 A | 12/1981 | Skelton |
| 4,321,672 A | 3/1982 | Braun |
| 4,433,436 A | 2/1984 | Carnes |
| 4,454,610 A | 6/1984 | Sziklai |
| RE31,692 E | 10/1984 | Tyburski et al. |
| 4,523,330 A | 6/1985 | Cain |
| 4,636,099 A | 1/1987 | Goldstone |
| 4,640,413 A | 2/1987 | Kaplan |
| 4,644,144 A | 2/1987 | Chandek |
| 4,722,444 A | 2/1988 | Murphy |
| 4,722,544 A | 2/1988 | Weber |
| 4,727,435 A | 2/1988 | Otani et al. |
| 4,774,663 A | 9/1988 | Musmanno |
| 4,790,475 A | 12/1988 | Griffin |
| 4,806,780 A | 2/1989 | Yamamoto |

(Continued)

FOREIGN PATENT DOCUMENTS

EP 0 984 410 A1 3/2000

OTHER PUBLICATIONS

Maya R. Gupta, Nathaniel P. Jacobson, Eric K. Garcia "OCR binarization and image pre-processing for searching historical documents", Pattern Recognition, vol. 40, No. 2. (Feb. 2007), pp. 389-397.*

(Continued)

*Primary Examiner* — Bhavesh Mehta
*Assistant Examiner* — Utpal Shah
(74) *Attorney, Agent, or Firm* — Brinks Hofer Gilson & Lione

(57) ABSTRACT

A system for processing an image for binarization comprises at least one subsystem that breaks the image into multiple sub-images, at least one subsystem that generates a histogram for each sub-image, and at least one subsystem that determines optimal thresholding values for image binarization by statistical analysis of the histogram for each sub-image.

18 Claims, 6 Drawing Sheets

U.S. PATENT DOCUMENTS

| | | |
|---|---|---|
| 4,837,693 A | 6/1989 | Schotz |
| 4,890,228 A | 12/1989 | Longfield |
| 4,927,071 A | 5/1990 | Wood |
| 4,934,587 A | 6/1990 | McNabb |
| 4,960,981 A | 10/1990 | Benton |
| 4,975,735 A | 12/1990 | Bright |
| 5,022,683 A | 6/1991 | Barbour |
| 5,053,607 A | 10/1991 | Carlson |
| 5,146,606 A | 9/1992 | Grondalski |
| 5,157,620 A | 10/1992 | Shaar |
| 5,159,548 A | 10/1992 | Caslavka |
| 5,191,525 A | 3/1993 | LeBrun |
| 5,193,121 A | 3/1993 | Elischer et al. |
| 5,220,501 A | 6/1993 | Lawlor |
| 5,227,863 A | 7/1993 | Bilbrey et al. |
| 5,229,589 A | 7/1993 | Schneider |
| 5,237,159 A | 8/1993 | Stephens |
| 5,257,320 A | 10/1993 | Etherington et al. |
| 5,265,008 A | 11/1993 | Benton |
| 5,321,816 A | 6/1994 | Rogan |
| 5,347,302 A | 9/1994 | Simonoff |
| 5,350,906 A | 9/1994 | Brody |
| 5,373,550 A | 12/1994 | Campbell |
| 5,419,588 A | 5/1995 | Wood |
| 5,422,467 A | 6/1995 | Graef |
| 5,475,403 A | 12/1995 | Havlovick et al. |
| 5,504,538 A | 4/1996 | Tsujihara |
| 5,504,677 A | 4/1996 | Pollin |
| 5,528,387 A | 6/1996 | Kelly et al. |
| 5,583,759 A | 12/1996 | Geer |
| 5,590,196 A | 12/1996 | Moreau |
| 5,594,225 A | 1/1997 | Botvin |
| 5,598,969 A | 2/1997 | Ong |
| 5,602,936 A | 2/1997 | Green |
| 5,610,726 A | 3/1997 | Nonoshita |
| 5,611,028 A | 3/1997 | Shibasaki |
| 5,630,073 A | 5/1997 | Nolan |
| 5,631,984 A | 5/1997 | Graf et al. |
| 5,668,897 A | 9/1997 | Stolfo |
| 5,673,320 A | 9/1997 | Ray |
| 5,677,955 A | 10/1997 | Doggett |
| 5,678,046 A | 10/1997 | Cahill et al. |
| 5,679,938 A | 10/1997 | Templeton |
| 5,680,611 A | 10/1997 | Rail |
| 5,691,524 A | 11/1997 | Josephson |
| 5,699,452 A | 12/1997 | Vaidyanathan |
| 5,734,747 A | 3/1998 | Vaidyanathan |
| 5,737,440 A | 4/1998 | Kunkler |
| 5,748,780 A | 5/1998 | Stolfo |
| 5,751,842 A | 5/1998 | Riach |
| 5,784,503 A | 7/1998 | Bleecker, III et al. |
| 5,830,609 A | 11/1998 | Warner |
| 5,832,463 A | 11/1998 | Funk |
| 5,838,814 A | 11/1998 | Moore |
| 5,863,075 A | 1/1999 | Rich |
| 5,870,456 A | 2/1999 | Rogers |
| 5,870,724 A | 2/1999 | Lawlor |
| 5,870,725 A | 2/1999 | Bellinger et al. |
| 5,878,337 A | 3/1999 | Joao |
| 5,893,101 A | 4/1999 | Balogh et al. |
| 5,897,625 A | 4/1999 | Gustin |
| 5,898,157 A | 4/1999 | Mangili et al. |
| 5,901,253 A | 5/1999 | Tretter |
| 5,903,878 A | 5/1999 | Talati |
| 5,903,881 A | 5/1999 | Schrader |
| 5,910,988 A | 6/1999 | Ballard |
| 5,917,931 A | 6/1999 | Kunkler |
| 5,924,737 A | 7/1999 | Schrupp |
| 5,926,548 A | 7/1999 | Okamoto |
| 5,930,778 A | 7/1999 | Geer |
| 5,937,396 A | 8/1999 | Konya |
| 5,940,844 A | 8/1999 | Cahill |
| 5,982,918 A | 11/1999 | Mennie |
| 5,987,439 A | 11/1999 | Gustin et al. |
| 6,012,048 A | 1/2000 | Gustin et al. |
| 6,014,454 A | 1/2000 | Kunkler |
| 6,021,202 A | 2/2000 | Anderson |
| 6,021,397 A | 2/2000 | Jones |
| 6,029,887 A | 2/2000 | Furuhashi |
| 6,030,000 A | 2/2000 | Diamond |
| 6,032,137 A | 2/2000 | Ballard |
| 6,038,553 A | 3/2000 | Hyde |
| 6,053,405 A | 4/2000 | Irwin, Jr. et al. |
| 6,073,119 A | 6/2000 | Bornemisza-wahr |
| 6,085,168 A | 7/2000 | Mori |
| 6,097,834 A | 8/2000 | Krouse |
| 6,097,885 A | 8/2000 | Rayner |
| 6,105,865 A | 8/2000 | Hardesty |
| 6,141,339 A | 10/2000 | Kaplan et al. |
| 6,145,738 A | 11/2000 | Stinson et al. |
| 6,151,426 A | 11/2000 | Lee |
| 6,159,585 A | 12/2000 | Rittenhouse |
| 6,170,744 B1 | 1/2001 | Lee |
| 6,188,506 B1 | 2/2001 | Kaiserman |
| 6,189,785 B1 | 2/2001 | Lowery |
| 6,192,165 B1 | 2/2001 | Irons |
| 6,195,694 B1 | 2/2001 | Chen et al. |
| 6,199,055 B1 | 3/2001 | Kara |
| 6,236,009 B1 | 5/2001 | Emigh et al. |
| 6,243,689 B1 | 6/2001 | Norton |
| 6,278,983 B1 | 8/2001 | Ball |
| 6,282,826 B1 | 9/2001 | Richards |
| 6,293,469 B1 | 9/2001 | Masson et al. |
| 6,304,860 B1 | 10/2001 | Martin |
| 6,314,452 B1 | 11/2001 | Dekel |
| 6,317,727 B1 | 11/2001 | May |
| 6,328,207 B1 | 12/2001 | Gregoire et al. |
| 6,330,546 B1 | 12/2001 | Gopinathan et al. |
| 6,339,658 B1 | 1/2002 | Moccagatta |
| 6,363,164 B1 | 3/2002 | Jones et al. |
| 6,390,362 B1 | 5/2002 | Martin |
| 6,397,196 B1 | 5/2002 | Kravetz |
| 6,408,084 B1 | 6/2002 | Foley |
| 6,411,725 B1 | 6/2002 | Rhoads |
| 6,411,737 B2 | 6/2002 | Wesolkowski et al. |
| 6,411,938 B1 | 6/2002 | Gates et al. |
| 6,413,305 B1 | 7/2002 | Mehta |
| 6,417,869 B1 | 7/2002 | Do |
| 6,425,017 B1 | 7/2002 | Dievendorff |
| 6,429,952 B1 | 8/2002 | Olbricht |
| 6,439,454 B1 | 8/2002 | Masson et al. |
| 6,449,397 B1 | 9/2002 | Che-Chu |
| 6,450,403 B1 | 9/2002 | Martens et al. |
| 6,464,134 B1 | 10/2002 | Page |
| 6,470,325 B1 | 10/2002 | Leemhuis |
| 6,505,178 B1 | 1/2003 | Flenley |
| 6,546,119 B2 | 4/2003 | Ciolli et al. |
| 6,574,609 B1 | 6/2003 | Downs |
| 6,578,760 B1 | 6/2003 | Otto |
| 6,587,837 B1 | 7/2003 | Spagna |
| 6,606,117 B1 | 8/2003 | Windle |
| 6,609,200 B2 | 8/2003 | Anderson |
| 6,611,598 B1 | 8/2003 | Hayosh |
| 6,614,930 B1 | 9/2003 | Agnihotri et al. |
| 6,643,416 B1 | 11/2003 | Daniels |
| 6,654,487 B1 | 11/2003 | Downs, Jr. |
| 6,661,910 B2 | 12/2003 | Jones et al. |
| 6,672,452 B1 | 1/2004 | Alves |
| 6,682,452 B2 | 1/2004 | Quintus |
| 6,695,204 B1 | 2/2004 | Stinson |
| 6,711,474 B1 | 3/2004 | Treyz et al. |
| 6,726,097 B2 | 4/2004 | Graef |
| 6,728,397 B2 | 4/2004 | Mcneal |
| 6,738,496 B1 * | 5/2004 | Van Hall .................. 382/101 |
| 6,742,128 B1 | 5/2004 | Joiner |
| 6,745,186 B1 | 6/2004 | Testa et al. |
| 6,754,640 B2 | 6/2004 | Bozeman |
| 6,755,340 B1 | 6/2004 | Voss |
| 6,763,226 B1 | 7/2004 | McZeal |
| 6,781,962 B1 | 8/2004 | Williams |
| 6,786,398 B1 | 9/2004 | Stinson |
| 6,789,054 B1 | 9/2004 | Makhlouf |
| 6,796,491 B2 | 9/2004 | Nakajima |
| 6,806,903 B1 * | 10/2004 | Okisu et al. ................ 348/254 |
| 6,813,733 B1 | 11/2004 | Li |
| 6,829,704 B2 | 12/2004 | Zhang |
| 6,844,885 B2 | 1/2005 | Anderson |

| | | |
|---|---|---|
| 6,856,965 B1 | 2/2005 | Stinson |
| 6,863,214 B2 | 3/2005 | Garner et al. |
| 6,870,947 B2 | 3/2005 | Kelland |
| 6,883,140 B1 | 4/2005 | Acker |
| 6,898,314 B2 | 5/2005 | Kung et al. |
| 6,902,105 B2 | 6/2005 | Koakutsu |
| 6,913,188 B2 | 7/2005 | Wong |
| 6,931,591 B1 | 8/2005 | Brown |
| 6,934,719 B2 | 8/2005 | Nally |
| 6,957,770 B1 | 10/2005 | Robinson |
| 6,961,689 B1 | 11/2005 | Greenberg |
| 6,970,843 B1 | 11/2005 | Forte |
| 6,973,589 B2 | 12/2005 | Wright |
| 6,983,886 B2 * | 1/2006 | Natsukari et al. ........... 235/462.1 |
| 6,993,507 B2 | 1/2006 | Meyer |
| 6,996,263 B2 | 2/2006 | Jones et al. |
| 6,999,943 B1 | 2/2006 | Johnson |
| 7,003,040 B2 | 2/2006 | Yi |
| 7,004,382 B2 | 2/2006 | Sandru |
| 7,010,155 B2 | 3/2006 | Koakutsu et al. |
| 7,010,507 B1 | 3/2006 | Anderson |
| 7,016,704 B2 | 3/2006 | Pallakoff |
| 7,039,048 B1 | 5/2006 | Monta |
| 7,058,036 B1 | 6/2006 | Yu |
| 7,062,099 B2 * | 6/2006 | Li et al. ........................ 382/237 |
| 7,062,456 B1 | 6/2006 | Riehl et al. |
| 7,062,768 B2 | 6/2006 | Kubo |
| 7,072,862 B1 | 7/2006 | Wilson |
| 7,076,458 B2 | 7/2006 | Lawlor et al. |
| 7,086,003 B2 | 8/2006 | Demsky |
| 7,092,561 B2 | 8/2006 | Downs, Jr. |
| 7,104,443 B1 | 9/2006 | Paul et al. |
| 7,113,925 B2 | 9/2006 | Waserstein |
| 7,114,649 B2 | 10/2006 | Nelson |
| 7,139,594 B2 | 11/2006 | Nagatomo |
| 7,140,539 B1 | 11/2006 | Crews |
| 7,163,347 B2 | 1/2007 | Lugg |
| 7,178,721 B2 | 2/2007 | Maloney |
| 7,181,430 B1 | 2/2007 | Buchanan et al. |
| 7,184,980 B2 | 2/2007 | Allen-Rouman et al. |
| 7,197,173 B2 | 3/2007 | Jones et al. |
| 7,200,255 B2 | 4/2007 | Jones |
| 7,204,412 B2 | 4/2007 | Foss, Jr. |
| 7,216,106 B1 | 5/2007 | Buchanan |
| 7,219,082 B2 | 5/2007 | Forte |
| 7,219,831 B2 | 5/2007 | Murata |
| 7,249,076 B1 | 7/2007 | Pendleton |
| 7,252,224 B2 | 8/2007 | Verma |
| 7,257,246 B1 | 8/2007 | Brodie et al. |
| 7,266,230 B2 | 9/2007 | Doran |
| 7,290,034 B2 | 10/2007 | Budd |
| 7,299,970 B1 | 11/2007 | Ching |
| 7,299,979 B2 | 11/2007 | Phillips |
| 7,313,543 B1 | 12/2007 | Crane |
| 7,314,163 B1 | 1/2008 | Crews et al. |
| 7,321,874 B2 | 1/2008 | Dilip |
| 7,321,875 B2 | 1/2008 | Dilip |
| 7,325,725 B2 | 2/2008 | Foss, Jr. |
| 7,328,190 B2 | 2/2008 | Smith et al. |
| 7,330,604 B2 | 2/2008 | Wu et al. |
| 7,336,813 B2 | 2/2008 | Prakash et al. |
| 7,343,320 B1 | 3/2008 | Treyz |
| 7,349,566 B2 | 3/2008 | Jones et al. |
| 7,356,505 B2 | 4/2008 | March |
| 7,377,425 B1 | 5/2008 | Ma |
| 7,379,978 B2 | 5/2008 | Anderson |
| 7,385,631 B2 | 6/2008 | Maeno |
| 7,386,511 B2 | 6/2008 | Buchanan |
| 7,391,897 B2 | 6/2008 | Jones |
| 7,391,934 B2 | 6/2008 | Goodall et al. |
| 7,392,935 B2 | 7/2008 | Byrne |
| 7,401,048 B2 | 7/2008 | Rosedale |
| 7,403,917 B1 | 7/2008 | Larsen |
| 7,406,198 B2 | 7/2008 | Aoki et al. |
| 7,421,107 B2 | 9/2008 | Lugg |
| 7,421,410 B1 | 9/2008 | Schechtman et al. |
| 7,433,098 B2 | 10/2008 | Klein et al. |
| 7,437,327 B2 | 10/2008 | Lam |
| 7,440,924 B2 | 10/2008 | Buchanan |
| 7,447,347 B2 | 11/2008 | Weber |
| 7,455,220 B2 | 11/2008 | Phillips |
| 7,455,221 B2 | 11/2008 | Sheaffer |
| 7,460,108 B2 | 12/2008 | Tamura |
| 7,461,779 B2 | 12/2008 | Ramachandran |
| 7,461,780 B2 | 12/2008 | Potts |
| 7,471,818 B1 | 12/2008 | Price |
| 7,475,040 B2 | 1/2009 | Buchanan |
| 7,477,923 B2 | 1/2009 | Wallmark |
| 7,480,382 B2 | 1/2009 | Dunbar |
| 7,480,422 B2 | 1/2009 | Ackley et al. |
| 7,489,953 B2 | 2/2009 | Griffin |
| 7,490,242 B2 | 2/2009 | Torres |
| 7,497,429 B2 | 3/2009 | Reynders |
| 7,503,486 B2 | 3/2009 | Ahles |
| 7,505,759 B1 | 3/2009 | Rahman |
| 7,506,261 B2 | 3/2009 | Satou |
| 7,509,287 B2 | 3/2009 | Nutahara |
| 7,512,564 B1 | 3/2009 | Geer |
| 7,519,560 B2 | 4/2009 | Lam |
| 7,520,420 B2 | 4/2009 | Phillips |
| 7,520,422 B1 | 4/2009 | Robinson et al. |
| 7,536,354 B1 | 5/2009 | deGroeve |
| 7,536,440 B2 | 5/2009 | Budd |
| 7,539,646 B2 | 5/2009 | Gilder |
| 7,540,408 B2 | 6/2009 | Levine |
| 7,542,598 B2 | 6/2009 | Jones |
| 7,545,529 B2 | 6/2009 | Borrey et al. |
| 7,548,641 B2 | 6/2009 | Gilson et al. |
| 7,566,002 B2 | 7/2009 | Love et al. |
| 7,571,848 B2 | 8/2009 | Cohen |
| 7,587,066 B2 | 9/2009 | Cordery et al. |
| 7,587,363 B2 | 9/2009 | Cataline |
| 7,590,275 B2 | 9/2009 | Clarke et al. |
| 7,599,543 B2 | 10/2009 | Jones |
| 7,599,888 B2 | 10/2009 | Manfre |
| 7,602,956 B2 | 10/2009 | Jones |
| 7,606,762 B1 | 10/2009 | Heit |
| 7,609,873 B2 | 10/2009 | Foth et al. |
| 7,619,721 B2 | 11/2009 | Jones |
| 7,620,231 B2 | 11/2009 | Jones |
| 7,620,604 B1 | 11/2009 | Bueche, Jr. |
| 7,630,518 B2 | 12/2009 | Frew et al. |
| 7,644,037 B1 | 1/2010 | Ostrovsky |
| 7,644,043 B2 | 1/2010 | Minowa |
| 7,647,275 B2 | 1/2010 | Jones |
| 7,668,363 B2 | 2/2010 | Price |
| 7,672,940 B2 | 3/2010 | Viola |
| 7,676,409 B1 | 3/2010 | Ahmad |
| 7,680,735 B1 | 3/2010 | Loy |
| 7,689,482 B2 | 3/2010 | Lam |
| 7,697,776 B2 | 4/2010 | Wu et al. |
| 7,698,222 B1 | 4/2010 | Bueche, Jr. |
| 7,702,588 B2 | 4/2010 | Gilder et al. |
| 7,734,545 B1 | 6/2010 | Fogliano |
| 7,743,979 B2 | 6/2010 | Fredman |
| 7,753,268 B1 | 7/2010 | Robinson et al. |
| 7,766,244 B1 | 8/2010 | Field |
| 7,769,650 B2 | 8/2010 | Bleunven |
| 7,792,752 B1 | 9/2010 | Kay |
| 7,792,753 B1 | 9/2010 | Slater et al. |
| 7,810,714 B2 | 10/2010 | Murata |
| 7,818,245 B2 | 10/2010 | Prakash et al. |
| 7,856,402 B1 | 12/2010 | Kay |
| 7,873,200 B1 | 1/2011 | Oakes, III et al. |
| 7,876,949 B1 | 1/2011 | Oakes, III et al. |
| 7,885,451 B1 | 2/2011 | Walls et al. |
| 7,885,880 B1 | 2/2011 | Prasad et al. |
| 7,894,094 B2 | 2/2011 | Nacman et al. |
| 7,896,232 B1 | 3/2011 | Prasad et al. |
| 7,900,822 B1 | 3/2011 | Prasad et al. |
| 7,912,785 B1 | 3/2011 | Kay |
| 7,949,587 B1 | 5/2011 | Morris et al. |
| 7,962,411 B1 | 6/2011 | Prasad et al. |
| 7,970,677 B1 | 6/2011 | Oakes, III et al. |
| 7,974,899 B1 | 7/2011 | Prasad et al. |
| 7,978,900 B2 | 7/2011 | Nepomniachtchi et al. |
| 7,996,314 B1 | 8/2011 | Smith et al. |
| 7,996,315 B1 | 8/2011 | Smith et al. |

| | | |
|---|---|---|
| 7,996,316 B1 | 8/2011 | Smith et al. |
| 8,001,051 B1 | 8/2011 | Smith et al. |
| 8,045,784 B2 | 10/2011 | Price et al. |
| 8,046,301 B1 | 10/2011 | Smith et al. |
| 8,204,293 B2 | 6/2012 | Csulits et al. |
| 2001/0014881 A1 | 8/2001 | Drummond |
| 2001/0018739 A1 | 8/2001 | Anderson |
| 2001/0027994 A1 | 10/2001 | Hayashida |
| 2001/0037299 A1 | 11/2001 | Nichols et al. |
| 2001/0042171 A1 | 11/2001 | Vermeulen |
| 2001/0042785 A1 | 11/2001 | Walker |
| 2001/0043748 A1 * | 11/2001 | Wesolkowski et al. ....... 382/237 |
| 2001/0047330 A1 | 11/2001 | Gephart |
| 2001/0054020 A1 | 12/2001 | Barth et al. |
| 2002/0001393 A1 | 1/2002 | Jones |
| 2002/0016763 A1 | 2/2002 | March |
| 2002/0016769 A1 | 2/2002 | Barbara et al. |
| 2002/0032656 A1 | 3/2002 | Chen |
| 2002/0038289 A1 | 3/2002 | Lawlor et al. |
| 2002/0052841 A1 | 5/2002 | Guthrie |
| 2002/0052853 A1 | 5/2002 | Munoz |
| 2002/0065786 A1 | 5/2002 | Martens et al. |
| 2002/0072974 A1 | 6/2002 | Pugliese |
| 2002/0075524 A1 | 6/2002 | Blair |
| 2002/0084321 A1 | 7/2002 | Martens |
| 2002/0087467 A1 | 7/2002 | Mascavage, III et al. |
| 2002/0107809 A1 | 8/2002 | Biddle et al. |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0129249 A1 | 9/2002 | Maillard et al. |
| 2002/0133409 A1 | 9/2002 | Sawano et al. |
| 2002/0138522 A1 | 9/2002 | Muralidhar |
| 2002/0147798 A1 | 10/2002 | Huang |
| 2002/0150279 A1 | 10/2002 | Scott |
| 2002/0152160 A1 | 10/2002 | Allen-Rouman et al. |
| 2002/0152161 A1 | 10/2002 | Aoike |
| 2002/0152164 A1 | 10/2002 | Dutta |
| 2002/0152165 A1 | 10/2002 | Dutta et al. |
| 2002/0152169 A1 | 10/2002 | Dutta et al. |
| 2002/0171820 A1 | 11/2002 | Okamura |
| 2002/0178112 A1 | 11/2002 | Goeller |
| 2002/0188564 A1 | 12/2002 | Star |
| 2002/0195485 A1 | 12/2002 | Pomerleau et al. |
| 2003/0005326 A1 | 1/2003 | Flemming |
| 2003/0023557 A1 | 1/2003 | Moore |
| 2003/0038227 A1 | 2/2003 | Sesek |
| 2003/0055756 A1 | 3/2003 | Allan |
| 2003/0055776 A1 | 3/2003 | Samuelson |
| 2003/0074315 A1 | 4/2003 | Lam |
| 2003/0075596 A1 | 4/2003 | Koakutsu |
| 2003/0075916 A1 | 4/2003 | Gorski |
| 2003/0081824 A1 | 5/2003 | Mennie |
| 2003/0093367 A1 | 5/2003 | Allen-Rouman et al. |
| 2003/0093369 A1 | 5/2003 | Ijichi et al. |
| 2003/0102714 A1 | 6/2003 | Rhodes et al. |
| 2003/0105688 A1 | 6/2003 | Brown |
| 2003/0105714 A1 | 6/2003 | Alarcon-Luther et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0191615 A1 | 10/2003 | Bailey |
| 2003/0191869 A1 | 10/2003 | Williams |
| 2003/0200174 A1 | 10/2003 | Star |
| 2003/0212904 A1 | 11/2003 | Randle et al. |
| 2003/0217005 A1 | 11/2003 | Drummond et al. |
| 2003/0225705 A1 | 12/2003 | Park et al. |
| 2003/0233278 A1 | 12/2003 | Marshall |
| 2003/0233318 A1 | 12/2003 | King et al. |
| 2004/0010466 A1 | 1/2004 | Anderson |
| 2004/0012496 A1 | 1/2004 | De Souza |
| 2004/0013284 A1 | 1/2004 | Yu |
| 2004/0024626 A1 | 2/2004 | Bruijning |
| 2004/0024708 A1 | 2/2004 | Masuda |
| 2004/0030741 A1 | 2/2004 | Wolton et al. |
| 2004/0057697 A1 | 3/2004 | Renzi |
| 2004/0058705 A1 | 3/2004 | Morgan |
| 2004/0066031 A1 | 4/2004 | Wong |
| 2004/0069841 A1 | 4/2004 | Wong |
| 2004/0071333 A1 | 4/2004 | Douglas et al. |
| 2004/0076320 A1 | 4/2004 | Downs, Jr. |
| 2004/0078299 A1 | 4/2004 | Down-Logan |
| 2004/0080795 A1 | 4/2004 | Bean et al. |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |
| 2004/0117302 A1 | 6/2004 | Weichert |
| 2004/0122754 A1 | 6/2004 | Stevens |
| 2004/0133511 A1 | 7/2004 | Smith et al. |
| 2004/0138974 A1 | 7/2004 | Shimamura |
| 2004/0148235 A1 | 7/2004 | Craig |
| 2004/0158549 A1 | 8/2004 | Matena |
| 2004/0165096 A1 | 8/2004 | Maeno |
| 2004/0170259 A1 | 9/2004 | Park |
| 2004/0210515 A1 | 10/2004 | Hughes |
| 2004/0210523 A1 | 10/2004 | Gains et al. |
| 2004/0228277 A1 | 11/2004 | Williams |
| 2004/0236647 A1 | 11/2004 | Acharya |
| 2004/0236688 A1 | 11/2004 | Bozeman |
| 2004/0240722 A1 | 12/2004 | Tsuji et al. |
| 2004/0245324 A1 | 12/2004 | Chen |
| 2004/0247199 A1 | 12/2004 | Murai et al. |
| 2004/0248600 A1 | 12/2004 | Kim |
| 2004/0252679 A1 | 12/2004 | Williams |
| 2004/0260636 A1 | 12/2004 | Marceau |
| 2004/0267666 A1 | 12/2004 | Minami |
| 2005/0001421 A1 | 1/2005 | Luth et al. |
| 2005/0010108 A1 | 1/2005 | Rahn et al. |
| 2005/0021466 A1 | 1/2005 | Buchanan et al. |
| 2005/0033645 A1 | 2/2005 | Duphily |
| 2005/0033685 A1 | 2/2005 | Reyes |
| 2005/0033695 A1 | 2/2005 | Minowa |
| 2005/0035193 A1 | 2/2005 | Gustin et al. |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |
| 2005/0049950 A1 | 3/2005 | Johnson |
| 2005/0071283 A1 | 3/2005 | Randle et al. |
| 2005/0075969 A1 | 4/2005 | Nielson |
| 2005/0075974 A1 | 4/2005 | Turgeon |
| 2005/0078336 A1 | 4/2005 | Ferlitsch |
| 2005/0080725 A1 | 4/2005 | Pick |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0091161 A1 | 4/2005 | Gustin |
| 2005/0096992 A1 | 5/2005 | Geisel |
| 2005/0097019 A1 | 5/2005 | Jacobs |
| 2005/0097046 A1 | 5/2005 | Singfield |
| 2005/0097050 A1 | 5/2005 | Orcutt |
| 2005/0108164 A1 | 5/2005 | Salafia |
| 2005/0108168 A1 | 5/2005 | Halpin |
| 2005/0115110 A1 | 6/2005 | Dinkins |
| 2005/0125338 A1 | 6/2005 | Tidwell et al. |
| 2005/0125360 A1 | 6/2005 | Tidwell et al. |
| 2005/0127160 A1 | 6/2005 | Fujikawa |
| 2005/0131820 A1 | 6/2005 | Rodriguez |
| 2005/0149436 A1 | 7/2005 | Elterich |
| 2005/0168566 A1 | 8/2005 | Tada |
| 2005/0171899 A1 | 8/2005 | Dunn |
| 2005/0171907 A1 | 8/2005 | Lewis |
| 2005/0177499 A1 | 8/2005 | Thomas |
| 2005/0177518 A1 | 8/2005 | Brown |
| 2005/0182710 A1 | 8/2005 | Anderson |
| 2005/0188306 A1 | 8/2005 | Mackenzie |
| 2005/0205661 A1 | 9/2005 | Taylor |
| 2005/0209961 A1 | 9/2005 | Michelsen |
| 2005/0228733 A1 | 10/2005 | Bent |
| 2005/0252955 A1 | 11/2005 | Sugai |
| 2005/0267843 A1 | 12/2005 | Acharya et al. |
| 2005/0268107 A1 | 12/2005 | Harris et al. |
| 2005/0269412 A1 | 12/2005 | Chiu |

| | | | | | | |
|---|---|---|---|---|---|---|
| 2005/0273368 A1 | 12/2005 | Hutten et al. | | 2007/0110277 A1 | 5/2007 | Hayduchok et al. |
| 2005/0278250 A1 | 12/2005 | Zair | | 2007/0118472 A1 | 5/2007 | Allen-Rouman et al. |
| 2005/0281448 A1 | 12/2005 | Lugg | | 2007/0122024 A1 | 5/2007 | Haas et al. |
| 2005/0281471 A1 | 12/2005 | LeConte | | 2007/0127805 A1 | 6/2007 | Foth et al. |
| 2005/0281474 A1 | 12/2005 | Huang | | 2007/0129955 A1 | 6/2007 | Dalmia |
| 2005/0289030 A1 | 12/2005 | Smith | | 2007/0136198 A1 | 6/2007 | Foth et al. |
| 2005/0289182 A1 | 12/2005 | Pandian et al. | | 2007/0140545 A1 | 6/2007 | Rossignoli |
| 2006/0002426 A1 | 1/2006 | Madour | | 2007/0140594 A1 | 6/2007 | Franklin |
| 2006/0004660 A1 | 1/2006 | Pranger | | 2007/0143208 A1 | 6/2007 | Varga |
| 2006/0025697 A1 | 2/2006 | Kurzweil | | 2007/0150337 A1 | 6/2007 | Hawkins et al. |
| 2006/0039628 A1 | 2/2006 | Li et al. | | 2007/0156438 A1 | 7/2007 | Popadic |
| 2006/0039629 A1 | 2/2006 | Li | | 2007/0168265 A1 | 7/2007 | Rosenberger |
| 2006/0041506 A1 | 2/2006 | Mason et al. | | 2007/0171288 A1 | 7/2007 | Inoue |
| 2006/0045321 A1 | 3/2006 | Yu | | 2007/0172107 A1 | 7/2007 | Jones et al. |
| 2006/0047593 A1 | 3/2006 | Naratil | | 2007/0172148 A1 | 7/2007 | Hawley |
| 2006/0053056 A1 | 3/2006 | Alspach-Goss | | 2007/0179883 A1 | 8/2007 | Questembert |
| 2006/0059085 A1 | 3/2006 | Tucker | | 2007/0183000 A1 | 8/2007 | Eisen et al. |
| 2006/0064368 A1 | 3/2006 | Forte | | 2007/0194102 A1 | 8/2007 | Cohen |
| 2006/0080245 A1 | 4/2006 | Bahl | | 2007/0198432 A1 | 8/2007 | Pitroda et al. |
| 2006/0085357 A1 | 4/2006 | Pizarro | | 2007/0203708 A1 | 8/2007 | Polcyn et al. |
| 2006/0102704 A1 | 5/2006 | Reynders | | 2007/0208816 A1 | 9/2007 | Baldwin et al. |
| 2006/0106691 A1 | 5/2006 | Sheaffer | | 2007/0217669 A1 | 9/2007 | Swift et al. |
| 2006/0106717 A1 | 5/2006 | Randle | | 2007/0235518 A1 | 10/2007 | Mueller et al. |
| 2006/0110063 A1 | 5/2006 | Weiss | | 2007/0235520 A1 | 10/2007 | Smith et al. |
| 2006/0112013 A1 | 5/2006 | Maloney | | 2007/0241179 A1 | 10/2007 | Davis |
| 2006/0115110 A1 | 6/2006 | Rodriguez | | 2007/0244782 A1 | 10/2007 | Chimento |
| 2006/0115141 A1* | 6/2006 | Koakutsu et al. .............. 382/139 | | 2007/0246525 A1 | 10/2007 | Smith et al. |
| 2006/0118613 A1 | 6/2006 | McMann | | 2007/0251992 A1 | 11/2007 | Sharma et al. |
| 2006/0144924 A1 | 7/2006 | Stover | | 2007/0255652 A1 | 11/2007 | Tumminaro |
| 2006/0144950 A1 | 7/2006 | Johnson | | 2007/0255653 A1 | 11/2007 | Tumminaro |
| 2006/0161501 A1 | 7/2006 | Waserstein | | 2007/0255662 A1 | 11/2007 | Tumminaro |
| 2006/0164682 A1 | 7/2006 | Lev | | 2007/0258634 A1 | 11/2007 | Simonoff |
| 2006/0167818 A1 | 7/2006 | Wentker et al. | | 2007/0271182 A1 | 11/2007 | Prakash et al. |
| 2006/0182331 A1 | 8/2006 | Gilson et al. | | 2007/0278286 A1 | 12/2007 | Crowell et al. |
| 2006/0182332 A1 | 8/2006 | Weber | | 2007/0288380 A1 | 12/2007 | Starrs |
| 2006/0186194 A1 | 8/2006 | Richardson et al. | | 2007/0288382 A1 | 12/2007 | Narayanan et al. |
| 2006/0206506 A1 | 9/2006 | Fitzpatrick | | 2007/0295803 A1 | 12/2007 | Levine et al. |
| 2006/0208059 A1 | 9/2006 | Cable et al. | | 2007/0299928 A1 | 12/2007 | Kohli et al. |
| 2006/0210138 A1 | 9/2006 | Hilton et al. | | 2008/0002911 A1 | 1/2008 | Eisen |
| 2006/0212391 A1 | 9/2006 | Norman et al. | | 2008/0021802 A1 | 1/2008 | Pendleton |
| 2006/0214940 A1 | 9/2006 | Kinoshita | | 2008/0040280 A1 | 2/2008 | Davis et al. |
| 2006/0215204 A1 | 9/2006 | Miyamoto et al. | | 2008/0052182 A1 | 2/2008 | Marshall |
| 2006/0215230 A1 | 9/2006 | Borrey et al. | | 2008/0059376 A1 | 3/2008 | Davis |
| 2006/0222260 A1 | 10/2006 | Sambongi et al. | | 2008/0063253 A1 | 3/2008 | Wood |
| 2006/0229976 A1 | 10/2006 | Jung | | 2008/0068674 A1 | 3/2008 | McIntyre |
| 2006/0229986 A1 | 10/2006 | Corder | | 2008/0071721 A1 | 3/2008 | Wang |
| 2006/0238503 A1 | 10/2006 | Smith | | 2008/0080760 A1 | 4/2008 | Ronca |
| 2006/0242062 A1 | 10/2006 | Peterson | | 2008/0086420 A1 | 4/2008 | Gilder et al. |
| 2006/0242063 A1 | 10/2006 | Peterson | | 2008/0086421 A1 | 4/2008 | Gilder |
| 2006/0249567 A1 | 11/2006 | Byrne | | 2008/0091599 A1 | 4/2008 | Foss, Jr. |
| 2006/0274164 A1 | 12/2006 | Kimura et al. | | 2008/0097899 A1 | 4/2008 | Jackson et al. |
| 2006/0279628 A1 | 12/2006 | Fleming | | 2008/0103790 A1 | 5/2008 | Abernethy |
| 2006/0282383 A1 | 12/2006 | Doran | | 2008/0103967 A1 | 5/2008 | Ackert et al. |
| 2006/0291744 A1 | 12/2006 | Ikeda et al. | | 2008/0113674 A1 | 5/2008 | Baig |
| 2007/0016796 A1 | 1/2007 | Singhal | | 2008/0114739 A1 | 5/2008 | Hayes |
| 2007/0019243 A1 | 1/2007 | Sato | | 2008/0116257 A1 | 5/2008 | Fickling |
| 2007/0022053 A1 | 1/2007 | Waserstein | | 2008/0117991 A1 | 5/2008 | Peddireddy |
| 2007/0027802 A1 | 2/2007 | VanDeburg et al. | | 2008/0119178 A1 | 5/2008 | Peddireddy |
| 2007/0031022 A1 | 2/2007 | Frew | | 2008/0133411 A1 | 6/2008 | Jones et al. |
| 2007/0038561 A1 | 2/2007 | Vancini et al. | | 2008/0147549 A1 | 6/2008 | Rathbun |
| 2007/0041629 A1 | 2/2007 | Prakash et al. | | 2008/0156438 A1 | 7/2008 | Stumphauzer et al. |
| 2007/0050292 A1 | 3/2007 | Yarbrough | | 2008/0162350 A1 | 7/2008 | Allen-Rouman et al. |
| 2007/0053574 A1 | 3/2007 | Verma et al. | | 2008/0162371 A1 | 7/2008 | Rampell et al. |
| 2007/0058851 A1 | 3/2007 | Quine | | 2008/0177659 A1 | 7/2008 | Lacey et al. |
| 2007/0063016 A1 | 3/2007 | Myatt | | 2008/0180750 A1 | 7/2008 | Feldman |
| 2007/0064991 A1 | 3/2007 | Douglas et al. | | 2008/0208727 A1 | 8/2008 | McLaughlin et al. |
| 2007/0065143 A1 | 3/2007 | Didow et al. | | 2008/0214180 A1 | 9/2008 | Cunningham et al. |
| 2007/0075772 A1 | 4/2007 | Kokubo | | 2008/0219543 A1 | 9/2008 | Csulits |
| 2007/0076940 A1 | 4/2007 | Goodall et al. | | 2008/0245869 A1 | 10/2008 | Berkun et al. |
| 2007/0076941 A1 | 4/2007 | Carreon et al. | | 2008/0247629 A1 | 10/2008 | Gilder |
| 2007/0077921 A1 | 4/2007 | Hayashi | | 2008/0247655 A1* | 10/2008 | Yano ............................. 382/232 |
| 2007/0080207 A1 | 4/2007 | Williams | | 2008/0249931 A1 | 10/2008 | Gilder |
| 2007/0082700 A1 | 4/2007 | Landschaft | | 2008/0249951 A1 | 10/2008 | Gilder et al. |
| 2007/0084911 A1 | 4/2007 | Crowell | | 2008/0262953 A1 | 10/2008 | Anderson |
| 2007/0086642 A1 | 4/2007 | Foth | | 2008/0275821 A1 | 11/2008 | Bishop et al. |
| 2007/0086643 A1 | 4/2007 | Spier | | 2008/0316542 A1 | 12/2008 | Mindrum et al. |
| 2007/0094088 A1 | 4/2007 | Mastie | | 2009/0024520 A1 | 1/2009 | Drory et al. |
| 2007/0094140 A1 | 4/2007 | Riney et al. | | 2009/0046938 A1 | 2/2009 | Yoder |
| 2007/0100748 A1 | 5/2007 | Dheer | | 2009/0060396 A1 | 3/2009 | Blessan et al. |

| | | | |
|---|---|---|---|
| 2009/0108080 | A1 | 4/2009 | Meyer |
| 2009/0110281 | A1* | 4/2009 | Hirabayashi ................ 382/180 |
| 2009/0141962 | A1 | 6/2009 | Borgia et al. |
| 2009/0166406 | A1 | 7/2009 | Pigg et al. |
| 2009/0171819 | A1 | 7/2009 | Emde et al. |
| 2009/0171825 | A1 | 7/2009 | Roman |
| 2009/0173781 | A1 | 7/2009 | Ramachandran |
| 2009/0190823 | A1 | 7/2009 | Walters |
| 2009/0192938 | A1 | 7/2009 | Amos |
| 2009/0236413 | A1 | 9/2009 | Mueller et al. |
| 2009/0252437 | A1 | 10/2009 | Li |
| 2009/0254447 | A1 | 10/2009 | Blades |
| 2009/0281904 | A1 | 11/2009 | Pharris |
| 2009/0313167 | A1 | 12/2009 | Dujari |
| 2010/0007899 | A1 | 1/2010 | Lay |
| 2010/0027679 | A1 | 2/2010 | Sunahara et al. |
| 2010/0047000 | A1 | 2/2010 | Park et al. |
| 2010/0057578 | A1 | 3/2010 | Blair et al. |
| 2010/0061446 | A1 | 3/2010 | Hands et al. |
| 2010/0082470 | A1 | 4/2010 | Walach |
| 2010/0165015 | A1 | 7/2010 | Barkley et al. |
| 2010/0226559 | A1 | 9/2010 | Najari et al. |
| 2010/0260408 | A1 | 10/2010 | Prakash et al. |
| 2010/0262522 | A1 | 10/2010 | Anderson et al. |
| 2010/0312705 | A1 | 12/2010 | Caruso et al. |
| 2011/0112967 | A1 | 5/2011 | Anderson et al. |

OTHER PUBLICATIONS

White, J. M. et al.: "Image Thresholding for Optical Character Recognition and Other Applications Requiring Character Image Extraction", IBM J. Res. Develop., vol. 27, No. 4, Jul. 1983, pp. 400-411.
"Accept "Customer Not Present" Checks," Accept Check Online, http://checksoftware.com, Cited in patent No. 7,900,822, as dated 2007 (1 pg).
"Adjusting Brightness and Contrast", www.eaglesoftware.com/adjustin.htm, retrieved on May 4, 2009 (4 pgs).
"Best practices for producing quality digital image files," Digital Images Guidelines, http://deepblue.lib.umich.edu/bitstream/2027.42/40247/1/Images-Best_Practice.pdf, downloaded 2007 (2 pgs).
"Chapter 7 Payroll Programs," Uniform Staff Payroll System, http://www2.oecn.k12.oh.us/www/ssdt/usps/usps_user_guide_005.html, Cited in patent No. 7,900,822, as dated 2007 (9 pgs).
"Check 21—The check is not in the post", RedTitan Technology 2004 http://www.redtitan.com/check21/htm (3 pgs).
"Check 21 Solutions," Columbia Financial International, Inc. http://www.columbiafinancial.us/check21/solutions.htm, Cited in patent No. 7,900,822, as dated 2007 (8 pgs).
"Check Fraud: A Guide to Avoiding Losses", All Net, http://all.net/books/audit/checkfraud/security.htm, Cited in patent No. 7,900,822, as dated 2007 (1 pg).
"Compliance with Regulation CC", http./www/federalreserve.gov/Pubs/regcc/regcc.htm, Jan. 24, 2006 (6 pgs).
"Customer Personalized Bank Checks and Address Labels" Checks Your Way Inc., http://www.checksyourway.com/htm/web_pages/faq.htm, Cited in patent No. 7,900,822, as dated 2007 (6 pgs).
"Direct Deposit Application for Payroll", Purdue University, Business Office Form 0003, http://purdue.edu/payroll/pdf/directdepositapplication.pdf, Jul. 2007 (2 pgs).
"Direct Deposit Authorization Form", www.umass.edu/humres/library/DDForm.pdf, May 2003 (3 pgs).
"Direct Deposit," University of Washington, http://www.washington.edu/admin/payroll/directdeposit.html, Cited in patent No. 7,900,822, as dated 2007 (3 pgs).
"Electronic Billing Problem: The E-check is in the mail" American Banker—vol. 168, No. 95, May 19, 2003 (4 pgs).
"Frequently Asked Questions" Bank of America, http://www/bankofamerica.com/deposits/checksave/index.cfm?template-lc_faq_bymail, Cited in patent No. 7,900,822, as dated 2007 (2 pgs).
"Full Service Direct Deposit", www.nonprofitstaffing.com/images/upload/dirdepform.pdf. Cited in patent No. 7,900,822, as dated 2001, (2 pgs).
"How to Digitally Deposit a Check Image", Smart Money Daily, Copyright 2008 (5 pgs).
"ImageNet Mobile Deposit Provides Convenient Check Deposit and Bill Pay to Mobile Consumers," Miteksystems, 2008 (2 pgs).
"It's the easiest way to Switch banks", LNB, http://www.inbky.com/pdf/LNBswitch-kit10-07.pdf Cited in patent No. 7,996,316, as dated 2007 (7 pgs).
"Lesson 38—More Bank Transactions", Turtle Soft, http://www.turtlesoft.com/goldenseal-software-manual.lesson38.htm, Cited in patent No. 7,900,822, as dated 2007 (8 pgs).
"Middleware", David E. Bakken, Encyclopedia of Distributed Computing, Kluwer Academic Press, 2001 (6 pgs).
"Mitek Systems Announces Mobile Deposit Application for Apple iPhone," http://prnewswire.com/cgi-bin/stories/pl?ACCT=104&STORY=/www/story/10-01-..., Nov. 25, 2008 (2 pgs).
"Personal Finance", PNC, http://www.pnc.com/webapp/unsec/productsandservice.do?sitearea=/PNC/home/personal/account+services/quick+switch/quick+switch+faqs, Cited in patent No. 7,900,822, as dated 2007 (12 pgs).
"Refractive index" Wikipedia, the free encyclopedia; http://en.wikipedia.org./wiki/refractiveindex.com Oct. 16, 2007 (4 pgs).
"Remote Deposit Capture", Plante & Moran, http://plantemoran.com/industries/fincial/institutions/bank/resources/community+bank+advisor/2007+summer+issue/remote+deposit+capture.htm, Cited in patent No. 7,900,822, as dated 2007 (3 pgs).
"Remote Deposit" National City, http://www.nationalcity.com/smallbusiness/cashmanagement/remotedeposit/default.asp; Cited in patent No. 7,900,822, as dated 2007 (1 pg).
"Save on ATM Fees", RedEye Edition, Chicago Tribune, Chicago, IL Jun. 30, 2007 (2 pgs).
"Switching Made Easy," Bank of North Georgia, http://www.banknorthgeorgia.com/cmsmaster/documents/286/documents616.pdf, 2007 (7 pgs).
"Two Words Every Business Should Know: Remote Deposit," Canon, http://www.rpsolutions.com/rpweb/pdfs/canon_rdc.pdf, 2005 (7 pgs).
"Virtual Bank Checks", Morebusiness.com, http://www.morebusiness.com/running_yourbusiness/businessbits/d908484987.brc, Cited in patent No. 7,900,822, as dated 2007 (3 pgs).
"WallStreetGrapevine.com" Stocks on the Rise: JADG, BKYI, MITK; Mar. 3, 2008 (4 pgs).
"What is check Fraud", National Check Fraud Center, http://www.ckfraud.org/ckfraud.html , Cited in patent No. 7,900,822, as dated 2007 (12 pgs).
Affinity Federal Credit Union, "Affinity Announces Online Deposit," Aug. 4, 2005 (1 pg).
Albrecht, W. Steve, "Check Kiting: Detection, Prosecution and Prevention," The FBI Law Enforcement Bulletin, Nov. 1, 1993 (6 pgs).
Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).
Amber Avalona-Butler / Paraglide, "At Your Service: Best iPhone Apps for Military Lifestyle," Jul. 9, 2010 (2 pgs).
Anderson, Milton M. "FSML and Echeck", Financial Services Technology Consortium, 1999 (17 pgs).
Archive Index Systems; Panini My Vision X-30 or VX30 or X30 © 1994-2008 Archive Systems, Inc. P./O. Box 40135 Bellevue, WA USA 98015 (2 pgs).
Associate of German Banks, SEPA 2008: Uniform Payment Instruments for Europe, Berlin, Cited in patent No. 7,900,822, as dated Jul. 2007, Bundesverbankd deutscher banker ev (42 pgs).
Automated Merchant Systems, Inc., "Electronic Check Conversion," http://www.automatedmerchant.com/electronic_check_conversion.cfm, 2006, downloaded Oct. 18, 2006 (3 pgs).
Bank Systems & Technology, Untitled Article, May 1, 2006, http://www.banktech.com/showarticle.jhtml? articleID=187003126, "Are you Winning in the Payment World?" (4 pgs).
BankServ, "DepositNow: What's the difference?" Cited in patent No. 7,970,677, as dated 2006, (4 pgs).
BankServ, Product Overview, http://www.bankserv.com/products/remotedeposit.htm, Cited in patent No. 7,970,677, as dated 2006, (3 pgs).

Blafore, Bonnie "Lower Commissions, Fewer Amenities", Better Investing, Madison Heights: Feb. 2003, vol. 52, Iss 6, (4 pgs).

BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 19, 2008 (5 pgs).

Blue Mountain Consulting, from URL: www.bluemontainconsulting.com, Cited in patent No. 7,900,822, as dated Apr. 26, 2006 (3 pgs).

Board of Governors of the federal reserve system, "Report to the Congress on the Check Clearing for the 21$^{st}$ Century Act of 2003" Apr. 2007, Submitted to Congress pursuant to section 16 of the Check Clearing for the 21$^{st}$ Century Act of 2003, (59 pgs).

Bruene, Jim; "Check Free to Enable In-Home Remote Check Deposit for Consumers and Small Business", NetBanker. Com, Financial Insite, Inc., http://www. netbanker.com/2008/02/checkfree_to_enableinhome_rem.html, Feb. 5, 2008 (3 pgs).

Bruene, Jim; "Digital Federal Credit Union and Four Others Offer Consumer Remote Deposit Capture Through EasCorp", NetBanker—Tracking Online Finance, www.netbanker.com/2008/04/digital_federal_credit_union_a.html, Apr. 13, 2008 (3 pgs).

Bruno, M., "Instant Messaging," Bank Technology News, Dec. 2002 (3 pgs).

Burnett, J. "Depository Bank Endorsement Requirements," BankersOnline.com, http://www.bankersonline.com/cgi-bin/printview/printview.pl, Jan. 6, 2003 (3 pgs).

Canon, ImageFormula CR-25/CR-55, "Improve Your Bottom Line with Front-Line Efficiencies", 0117W117, 1207-55/25-1 OM-BSP, Cited in U.S. Pat No. 7,949,587 as dated 2007. (4 pgs).

Carrubba, P. et al., "Remote Deposit Capture: A White Paper Addressing Regulatory, Operational and Risk Issues," NetDeposit Inc., 2006 (11 pgs).

Century Remote Deposit High-Speed Scanner User's Manual Release 2006, (Century Manual), Century Bank, 2006, (32 pgs).

Chiang, Chuck, The Bulletin, "Remote banking offered", http://bendbulletin.com/apps/pbcs.dll/article?AID=/20060201/BIZ0102/602010327&templ..., May 23, 2008 (2 pgs).

CNN.com/technology, "Scan, deposit checks from home", www.cnn.com/2008ITECH/biztech/02/07/check.scanning.ap/index.html, Feb. 7, 2008 (3 pgs).

Constanzo, Chris, "Remote Check Deposit: Wells Captures A New Checking Twist", Bank Technology News Article—May 2005, www.americanbanker.com/btn_article.html?id=20050502YQ50FSYG (2 pgs).

Craig, Ben, "Resisting Electronic Payment Systems: Burning Down the House?", Federal Reserve Bank of Cleveland, Jul. 1999 (4 pgs).

Creativepaymentsolutions.com, "Creative Payment Solutions—Websolution," www.creativepaymentsolution.com/cps/financialservices/websolution/default.html, Copyright 2008, Creative Payment Solutions, Inc. (1 pg).

Credit Union Journal, "The Ramifications of Remote Deposit Capture Success", www.cuijournal.com/orintthis.html?id=20080411EODZT57G, Apr. 14, 2008 (1 pg).

Credit Union Journal, "AFCU Averaging 80 DepositHome Transactions Per Day", Credit Union Journal, Aug. 15, 2005 (1 pg).

DCU Member's Monthly—Jan. 2008, "PC Deposit—Deposit Checks from Home!", http://www.mycreditunionnewsletter.com/dcu/01 08/page1. html, Copyright 2008 Digital Federal Credit Union (2 pgs).

De Jesus, A. et al., "Distributed Check Processing in a Check 21 Environment: An educational overview of the opportunities and challenges associated with implementing distributed check imaging and processing solutions," Panini, 2004, pp. 1-22.

De Queiroz, Ricardo et al., "Mixed Raster Content (MRC) Model for Compound Image Compression", 1998 (14 pgs).

Debello, James et al., "RDM and Mitek Systems to Provide Mobile Check Deposit," Mitek Systems, Inc., San Diego, California and Waterloo, Ontario, (Feb. 24, 2009), 2 pgs.

DeYoung, Robert; "The Financial Performance of Pure Play Internet Banks"; Federal Reserve Bank of Chicago Economic Perspectives; 2001; pp. 60-75; vol. 25, No. 1 (16pgs).

Dias, Danilo et al., "A Model for the Electronic Representation of Bank Checks", Brasilia Univ. Oct. 2006 (5 pgs).

Digital Transactions News, "An ACH-Image Proposal for Check Roils Banks and Networks" May 26, 2006 (3 pgs).

Dinan, R.F. et al., "Image Plus High Performance Transaction System", IBM Systems Journal, 1990 vol. 29, No. 3 (14 pgs).

eCU Technologies, "Upost Remote Deposit Solution," Retrieved from the internet https://www.eutechnologies.com/products/upost.html, downloaded 2009 (1 pg).

EFT Network Unveils FAXTellerPlus, EFT Network, Inc., www.eftnetwork.com, Jan. 13, 2009 (2 pgs).

ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).

Federal Check 21 Act, "New Check 21 Act effective Oct. 28, 2004: Bank No Longer Will Return Original Cancelled Checks," Consumer Union's FAQ's and Congressional Testimony on Check 21, www.consumerlaw.org.initiatives/content/check21_content.html, Cited in patent No. 7,873,200, as dated Dec. 2005 (20 pgs).

Federal Reserve Board, "Check Clearing for the 21st Century Act", FRB, http://www.federalreserve.gov/paymentsystems/truncation/, Mar. 1, 2006 (1 pg).

Federal Reserve System, "12 CFR, Part 229 [Regulation CC]: Availability of Funds and Collection of Checks," Federal Registrar, Apr. 28, 1997, pp. 1-50.

Federal Reserve System, "Part IV, 12 CFR Part 229 [Regulation CC]: Availability of Funds and Collection of Checks; Final Rule," Federal Registrar, vol. 69, No. 149, Aug. 4, 2004, pp. 47290-47328.

Fest, Glen., "Patently Unaware" Bank Technology News, Apr. 2006, Retrieved from the internet at URL:http://banktechnews.com/article.html?id=2006403T7612618 (5 pgs).

Fidelity Information Services, "Strategic Vision Embraces Major Changes in Financial Services Solutions: Fidelity's long-term product strategy ushers in new era of application design and processing," Insight, 2004, pp. 1-14.

Fisher, Dan M., "Home Banking in the 21st Century: Remote Capture Has Gone Retail", May 2008 (4 pgs).

Furst, Karen et al., "Internet Banking: Developments and Prospects", Economic and Policy Analysis Working Paper 2000-9, Sep. 2000 (60 pgs).

Garry, M., "Checking Options: Retailers face an evolving landscape for electronic check processing that will require them to choose among several scenarios," Supermarket News, vol. 53, No. 49, 2005 (3 pgs).

German Shegalov, Diplom-Informatiker, "Integrated Data, Message, and Process Recovery for Failure Masking in Web Services", Dissertation Jul. 2005 (146 pgs).

Gupta, Amar et al., "An Integrated Architecture for Recognition of Totally Unconstrained Handwritten Numerals", WP#3765, Jan. 1993, Productivity from Information Technology "Profit" Research Initiative Sloan School of Management (20 pgs).

Hale, J., "Picture this: Check 21 uses digital technology to speed check processing and shorten lag time," Columbus Business First, http://columbus.bizjournals.com/columbus/stories/2005/03/14focus1.html, downloaded 2007 (3 pgs).

Hartly, Thomas, "Banks Check Out New Image", Business First, Buffalo: Jul. 19, 2004, vol. 20, Issue 43, (3 pgs).

Heckenberg, D. "Using Mac OS X for Real-Time Image Processing" Oct. 8, 2003 (15 pgs).

Hildebrand, C. et al., "Electronic Money," Oracle, http://www.oracle.com/oramag/profit/05-feb/p15financial.html, 2005, downloaded Oct. 18, 2006 (5 pgs).

Hillebrand, G., "Questions and Answers About the Check Clearing for the 21st Century Act, 'Check 21," ConsumersUnion.org, http://www.consumersunion.org/finance/ckclear1002.htm, Jul. 27, 2004, downloaded Oct. 18, 2006 (6 pgs).

Image Master, "Photo Restoration: We specialize in digital photo restoration and photograph repair of family pictures", http://www.imphotorepair.com, Cited in patent No. 7,900,822, as downloaded Apr. 2007 (1 pg).

Investment Systems Company, "Portfolio Accounting System," 2000, pp. 1-32.

JBC, "What is a MICR Line?," eHow.com, retrieved from http://www.ehow.com/about_4684793_what-micr-line.html on May 4, 2009 (2 pgs).

Johnson, Jennifer J., Secretary of the Board; Federal Reserve System, 12 CFR Part 229, Regulation CC; "Availability of Funds and Collection of Checks". Cited in patent No. 7,900,822, as dated 2009, (89 pgs).

Kendrick, Kevin B., "Check Kiting, Float for Purposes of Profit," Bank Security & Fraud Prevention, vol. 1, No. 2, 1994 (3 pgs).

Kiser, Elizabeth K.; "Modeling the Whole Firm: The Effect of Multiple Inputs and Financial Intermediation on Bank Deposit Rates;" FEDS Working Paper No. 2004-07; Jun. 3, 2003; pp. 1-46 (46 pgs).

Knestout, Brian P. et al., "Banking Made Easy" Kiplinger's Personal Finance Washington, Jul. 2003, vol. 57, Iss 7 (5 pgs).

Kornai Andras et al., "Recognition of Cursive Writing on Personal Checks", Proceedings of International Workshop on the Frontiers in Handwritting Recognition, Cited in patent No. 7,900,822, as dated Sep. 1996, (6 pgs).

Levitin, Adam J., Remote Deposit Capture: A Legal and Transactional Overview, Banking Law Journal, p. 115, 2009 (RDC).

Masonson, L., "Check Truncation and ACH Trends—Automated Clearing Houses", healthcare financial management associate, http://www.findarticles.com/p/articles/mLm3276/is_n7_v47/ai_14466034/print, 1993 (2 pgs).

Matthews, Deborah, "Advanced Technology Makes Remote Deposit Capture Less Risky," Indiana Bankers Association, Apr. 2008 (2 pgs).

Metro 1 Credit Union, "Remote Banking Services," hltp://ww\\i.metro1cu.org/metro1cu/remote.html, downloaded Apr. 17, 2007 (4 pgs).

Mitek systems, "Imagenet Mobile Deposit", San Diego, CA, downloaded 2009 (2 pgs).

Mitek Systems: Mitek Systems Launches First Mobile Check Deposit and Bill Pay Application, San Diego, CA, Jan. 22, 2008 (3 pgs).

Mohl, Bruce, "Banks Reimbursing ATM Fee to Compete With Larger Rivals", Boston Globe, Boston, MA, Sep. 19, 2004 (3 pgs).

Moreau, T., "Payment by Authenticated Facsimile Transmission: a Check Replacement Technology for Small and Medium Enterprises," CONNOTECH Experts-conseils, Inc., Apr. 1995 (31 pgs).

Nelson, B. et al., "Remote deposit capture changes the retail landscape," Northwestern Financial Review, http://findarticles.com/p/articles/mi qa3799/is200607/ai_n16537250, 2006 (3 pgs).

NetBank, Inc., "Branch Out: Annual Report 2004," 2004 (150 pgs).

NetBank, Inc., "Quick Post: Deposit and Payment Forwarding Service," 2005 (1 pg).

NetDeposit Awarded Two Patents for Electronic Check Process, NetDeposit, Jun. 18, 2007, (1 pg).

Nixon, Julie et al., "Fiserv Research Finds Banks are Interested in Offering Mobile Deposit Capture as an," Fiserv, Inc. Brookfield, Wis., (Business Wire), (Feb. 20, 2009), 2 pgs.

Online Deposit: Frequently Asked Questions, http://www.depositnow.com/faq.html, Copyright 2008 (1 pg).

Onlinecheck.com/Merchant Advisors, "Real-Time Check Debit", Merchant Advisors: Retail Check Processing Check Conversion, http://www.onlinecheck/wach/rcareal.htm, Cited in patent No. 7,900,822, as dated 2006 (3 pgs).

Oxley, Michael G., from committee on Financial Services; "Check Clearing for the 21$^{st}$ Century Act, 108$^{th}$ Congress, 1$^{st}$ Session House of Representatives report 108-132", Jun. 2003 (20 pgs).

Oxley, Michael G., from the committee of conference; "Check Clearing for the 21$^{st}$ Century Act" 108$^{th}$ Congress, 1$^{st}$ Session Senate report 108-291, Oct. 1, 2003 (27 pgs).

Palacios, Rafael et al., "Automatic Processing of Brazilian Bank Checks". Cited in patent No. 7,900,822, as dated 2002 (28 pgs).

Patterson, Scott "USAA Deposit@Home—Another WOW moment for Net Banking", NextCU.com, Jan. 26, 2007 (5 pgs).

Public Law 108-100, 108 Congress; "An Act Check Clearing for the 21$^{st}$ Century Act", Oct. 28, 2003, 117 STAT. 1177 (18 pgs).

Rao, Bharat; "The Internet and The Revolution in Distribution: A Cross-Industry Examination"; Technology in Society; 1999; pp. 287-306; vol. 21, No. 3 (20 pgs).

Remotedepositcapture, URL:www.remotedepositcapture.com, Cited in patent No. 7,900,822, as dated 2006 (5 pgs).

RemoteDepositCapture.com, "PNC Bank to Offer Ease of Online Deposit Service Integrated with QuickBooks to Small Businesses", Remote Deposit Capture News Articles from Jul. 24, 2006, (2 pgs).

RemoteDepositCapture.com, Remote Deposit Capture News Articles from Jul. 6, 2006, "BankServ Announces New Remote Deposit Product Integrated with QuickBooks" (3 pgs).

Remotedepsitcapture.com, LLC, "Remote Deposit Capture Overview," ROC Overview, http://remotedepositcapture.com/overview/RDC_overview.htm, Cited in patent No. 7,900,822, as dated Mar. 12, 2007 (4 pgs).

Richey, J. C. et al., "EE 4530 Check Imaging," Nov. 18, 2008 (10 pgs).

Ritzer, J.R. "Hinky Dinky helped spearhead POS, remote banking movement", Bank Systems and Equipment, vol. 21, No. 12, Dec. 1984 (1 pg).

Rivlin, Alice M. et al., Chair, Vice Chair—Board of Governors, Committee on the Federal Reserve in the Payments Mechanism—Federal Reserve System, "The Federal Reserve in the Payments Mechanism", Jan. 1998 (41 pgs).

Rose, Sarah et al., "Best of the We: The Top 50 Financial Websites", Money, New York, Dec. 1999, vol. 28, Iss. 12 (8 pgs).

Shelby, Hon. Richard C. (Committee on Banking, Housing and Urban Affairs); "Check Truncation Act of 2003", calendar No. 168, 108$^{th}$ Congress, 1$^{st}$ Session Senate report 108-79, Jun. 2003 (27 pgs).

SoyBank Anywhere, "Consumer Internet Banking Service Agreement," Dec. 6, 2004 (6 pgs).

Teixeira, D., "Comment: Time to Overhaul Deposit Processing Systems," American Banker, Dec. 10, 1998, vol. 163, No. 235, p. 15 (3 pgs).

Thailandguru.com: How and where to Pay Bills @ www.thailandguru.com/paying-bills.html (2 pgs), 1999.

The Automated Clearinghouse, "Retail Payment Systems; Payment Instruments Clearing and Settlement: The Automated Clearinghouse (ACH)", www.ffiec.gov/ffiecinfobase/booklets/retailretail_02d.html, Cited in patent No. 7,900,822, as dated Dec. 2005 (3 pgs).

The Green Sheet 2.0: Newswire, "CO-OP adds home deposit capabilities to suite of check imaging products", www.greensheet.com/newswire.php?newswire_id=8799, Mar. 5, 2008 (2 pgs).

Tygar, J.D., Atomicity in Electronic Commerce, In ACM Networker, 2:2, Apr./May 1998 (12 pgs).

Valentine, Lisa, "Remote Deposit Capture Hot Just Got Hotter," ABA Banking Journal, Mar. 2006, p. 1-9.

Wade, Will, "Early Notes: Updating Consumers on Check 21" American Banker Aug. 10, 2004 (3 pgs).

Wallison, Peter J., "Wal-Mart Case Exposes Flaws in Banking-Commerce Split", American Banker, vol. 167. No. 8, Jan. 11, 2002 (3 pgs).

Wells Fargo 2005 News Releases, "The New Wells Fargo Electronic Deposit Services Break Through Banking Boundaries in the Age of Check 21", San Francisco Mar. 28, 2005, www.wellsfargo.com/press/3282005_check21Year=2005 (1 pg).

Wells Fargo Commercial, "Remote Deposit", www.wellsfargo.com/com/treasury mgmtlreceivables/electronic/remote deposit, Copyright 2008 (1 pg).

Whitney et al., "Reserve Banks to Adopt DSTU X9.37/2003 Format for Check 21 Image Services", American Bankers Association, May 18, 2004, http://www.aba/com/NR/rdonlyres/CBDC1 A5C-43E3-43CC-B733-BE417C638618/35930/DSTUFormat.pdf (2 pages).

Wikipedia ®, "Remote Deposit," http://en.wikipedia.org/wiki/Remote_deposit, 2007 (3 pgs).

Windowsfordevices.com, "Software lets camera phone users deposit checks, pay bills", www.windowsfordevices.com/news/NS3934956670.html, Jan. 29, 2008 (3 pgs).

Wolfe, Daniel, "Check Image Group Outlines Agenda," American Banker, New York, N. Y.: Feb. 13, 2009, vol. 174, Iss. 30, p. 12. (2 pgs).

Woody Baird Associated Press, "Pastor's Wife got Scammed—She Apparently Fell for Overseas Money Scheme," The Commercial Appeal, Jul. 1, 2006, p. A. 1.

Zions Bancorporation, "Moneytech, the technology of money in our world: Remote Deposit," http://www.bankjunior.com/pground/moneytech/remote_deposit.jsp, 2007 (2 pgs).

Application as filed on Apr. 3, 2008 for U.S. Appl. No. 12/062,143 (27 pgs).

Application as filed on Aug. 19, 2010 for U.S. Appl. No. 12/859,741 (235 pgs).
Application as filed on Aug. 21, 2008 for U.S. Appl. No. 12/195,723 (38 pgs).
Application as filed on Aug. 21, 2009 for U.S. Appl. No. 12/545,127 (45 pgs).
Application as filed on Aug. 28, 2009 for U.S. Appl. No. 12/549,443 (41 pgs).
Application as filed on Dec. 20, 2006 for U.S. Appl. No. 11/613,656 (21 pgs).
Application as filed on Dec. 30, 2010 for U.S. Appl. No. 12/982,494 (280 pgs).
Application as filed on Dec. 30, 2010 for U.S. Appl. No. 12/982,561 (275 pgs).
Application as filed on Dec. 30, 2010 for U.S. Appl. No. 12/982,578 (274 pgs).
Application as filed on Dec. 30, 2010 for U.S. Appl. No. 12/982,594 (275 pgs).
Application as filed on Feb. 18, 2009 for U.S. Appl. No. 12/388,005 (37 pgs).
Application as filed on Jul. 13, 2006 for U.S. Appl. No. 11/487,537 (23 pgs).
Application as filed on Jul. 27, 2009 for U.S. Appl. No. 12/509,613 (48 pgs).
Application as filed on Jul. 27, 2009 for U.S. Appl. No. 12/509,680 (41 pgs).
Application as filed on Jun. 11, 2008 for U.S. Appl. No. 12/137,051 (29 pgs).
Application as filed on Jun. 8, 2011 for U.S. Appl. No. 13/155,976 (352 pgs).
Application as filed on Jun. 8, 2011 for U.S. Appl. No. 13/156,007 (356 pgs).
Application as filed on Jun. 8, 2011 for U.S. Appl. No. 13/156,018 (353 pgs).
Application as filed on Mar. 15, 2007 for U.S. Appl. No. 11/686,924 (34 pgs).
Application as filed on Mar. 15, 2007 for U.S. Appl. No. 11/686,928 (36 pgs).
Application as filed on Mar. 4, 2009 for U.S. Appl. No. 12/397,671 (40 pgs).
Application as filed on Mar. 4, 2009 for U.S. Appl. No. 12/397,930 (37 pgs).
Application as filed on May 10, 2007 for U.S. Appl. No. 11/747,222 (35 pgs).
Application as filed on Oct. 17, 2008 for U.S. Appl. No. 12/253,278 (42 pgs).
Application as filed on Oct. 23, 2007 for U.S. Appl. No. 11/876,925 (36 pgs).
Application as filed on Oct. 23, 2007 for U.S. Appl. No. 11/877,335 (29 pgs).
Application as filed on Oct. 25, 2007 for U.S. Appl. No. 11/923,839 (22 pgs).
Application as filed on Oct. 29, 2007 for U.S. Appl. No. 11/926,388 (23 pgs).
Application as filed on Oct. 30, 2007 for U.S. Appl. No. 11/928,297 (26 pgs).
Application as filed on Oct. 31, 2006 for U.S. Appl. No. 11/590,974 (31 pgs).
Application as filed on Oct. 31, 2006 for U.S. Appl. No. 11/591,008 (27 pgs).
Application as filed on Oct. 31, 2006 for U.S. Appl. No. 11/591,227 (58 pgs).
Application as filed on Oct. 31, 2006 for U.S. Appl. No. 11/591,273 (56 pgs).
Application as filed on Oct. 31, 2007 for U.S. Appl. No. 11/930,537 (27 pgs).
Application as filed on Oct. 31, 2007 for U.S. Appl. No. 11/931,670 (47 pgs).
Application as filed on Oct. 8, 2007 for U.S. Appl. No. 11/868,884 (30 pgs).
Application as filed on Sep. 28, 2007 for U.S. Appl. No. 11/864,569 (35 pgs).
Application as filed on Sep. 8, 2008 for U.S. Appl. No. 12/205,996 (30 pgs).
Claims as filed on Apr. 3, 2008 for U.S. Appl. No. 12/062,163 (3 pgs).
Claims as filed on Apr. 3, 2008 for U.S. Appl. No. 12/062,175 (3 pgs).
Claims as filed on Aug. 19, 2010 for U.S. Appl. No. 12/859,752 (5 pgs).
Claims as filed on Dec. 15, 2011 for U.S. Appl. No. 13/327,478 (4 pgs).
Claims as filed on Dec. 20, 2006 for U.S. Appl. No. 11/613,671 (3 pgs).
Claims as filed on Dec. 8, 2010 for U.S. Appl. No. 12/963,513 (7 pgs).
Claims as filed on Feb. 16, 2011 for U.S. Appl. No. 13/028,477 (3 pgs).
Claims as filed on Jan. 20, 2011 for U.S. Appl. No. 13/010,644 (9 pgs).
Claims as filed on Jan. 31, 2011 for U.S. Appl. No. 13/017,865 (11 pgs).
Claims as filed on Mar. 15, 2007 for U.S. Appl. No. 11/686,925 (5 pgs).
Claims as filed on May 10, 2007 for U.S. Appl. No. 11/747,223 (4 pgs).
Claims as filed on May 18, 2011 for U.S. Appl. No. 13/110,077 (9 pgs).
Claims as filed on May 2, 2011 for U.S. Appl. No. 13/098,566 (10 pgs).
Claims as filed on Oct. 23, 2007 for U.S. Appl. No. 11/877,382 (6 pgs).
Claims as filed on Oct. 24, 2008 for U.S. Appl. No. 12/257,471 (4 pgs).
Claims as filed on Oct. 31, 2006 for U.S. Appl. No. 11/590,963 (3 pgs).
Claims as filed on Oct. 31, 2006 for U.S. Appl. No. 11/590,995 (3 pgs).
Claims as filed on Oct. 31, 2006 for U.S. Appl. No. 11/590,998 (4 pgs).
Claims as filed on Oct. 31, 2007 for U.S. Appl. No. 11/931,804 (4 pgs).
Claims as filed on Oct. 8, 2007 for U.S. Appl. No. 11/868,878 (4 pgs).
Claims as filed on Sep. 2, 2008 for U.S. Appl. No. 12/202,781 (4 pgs).
Claims as filed on Sep. 8, 2008 for U.S. Appl. No. 12/206,001 (3 pgs).
Claims as filed on Sep. 8, 2008 for U.S. Appl. No. 12/206,007 (3 pgs).
Application as filed on Feb. 15, 2012 for U.S. Appl. No. 13/397,405 (19 pgs).
Application as filed Sep. 14, 2012 for U.S. Appl. No. 13/619,405 (30 pgs).
Claims as filed on Dec. 29, 2005 for U.S. Appl. No. 11/320,998 (3 pgs).
Claims as filed on Dec. 29, 2005 for U.S. Appl. No. 11/321,027 (3 pgs).
Claims as filed on Feb. 15, 2012 for U.S. Appl. No. 13/397,437 (6 pgs).
Claims as filed on Sep. 14, 2012 for U.S. Appl. No. 13/619,026 (3 pgs).

* cited by examiner

SYSTEMS AND METHODS FOR ADAPTIVE BINARIZATION OF AN IMAGE

CROSS REFERENCE TO RELATED APPLICATIONS

The patent applications below (including the present patent application) are filed concurrently and share a common title and disclosure, each of which is hereby incorporated herein by reference in its entirety:

U.S. patent application Ser. No. 12/253,284, filed on Oct. 17, 2008 and entitled "Systems and Method for Adaptive Binarization of an Image."; and U.S. patent application Ser. No. 12/253,288, filed on Oct. 17, 2008 and entitled "Systems and Method for Adaptive Binarization of an Image."

BACKGROUND

In the area of digital image processing and automated reading of text on digital images, the images often get thresholded (i.e., binarized) from a grayscale image to a binary image. Image binarization converts an image of up to 256 gray levels to a black and white image. Frequently, binarization is used as a pre-processor before optical character recognition (OCR) or intelligent character recognition (ICR). In fact, most OCR packages on the market work only on bi-level (black & white) images. The simplest way to use image binarization is to choose a threshold value, and classify all pixels with values above this threshold as white, and all other pixels as black. The problem then is how to select the correct threshold. In many cases, finding one threshold compatible to the entire image is very difficult, and in many cases even impossible.

For example, in the banking industry, areas of interest to be automatically read from a digital image of a personal check may include text in the magnetic ink character recognition (MICR) line of the check or the handwritten amount on the check. Often, people put checks in their pockets which causes fold lines on the check. These fold lines often come up as gray areas around objects of interest such as the (MICR) line of the check, the handwritten amount on the check, the payee, etc. When OCR or ICR software fails to read these areas a person must look at the check and manually key in these amounts. Also, this may cause difficulty in converting the check image to a binary image to be sent as an image cash letter for regulatory compliance. This results in more money being spent on people to manually review bad check images due to poor binarization conversion for certain check images.

In this regard, there is a need for systems and methods that overcome shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for adaptive binarization of an image are provided. For several embodiments, a system for processing an image for binarization comprising at least one subsystem that breaks the image into multiple sub-images, at least one subsystem that generates a histogram for each sub-image, and at least one subsystem that determines optimal thresholding values for image binarization by statistical analysis of the histogram for each sub-image.

Other features and embodiments are described below.

BRIEF DESCRIPTION OF THE DRAWINGS

Systems methods for adaptive binarization of an image are further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
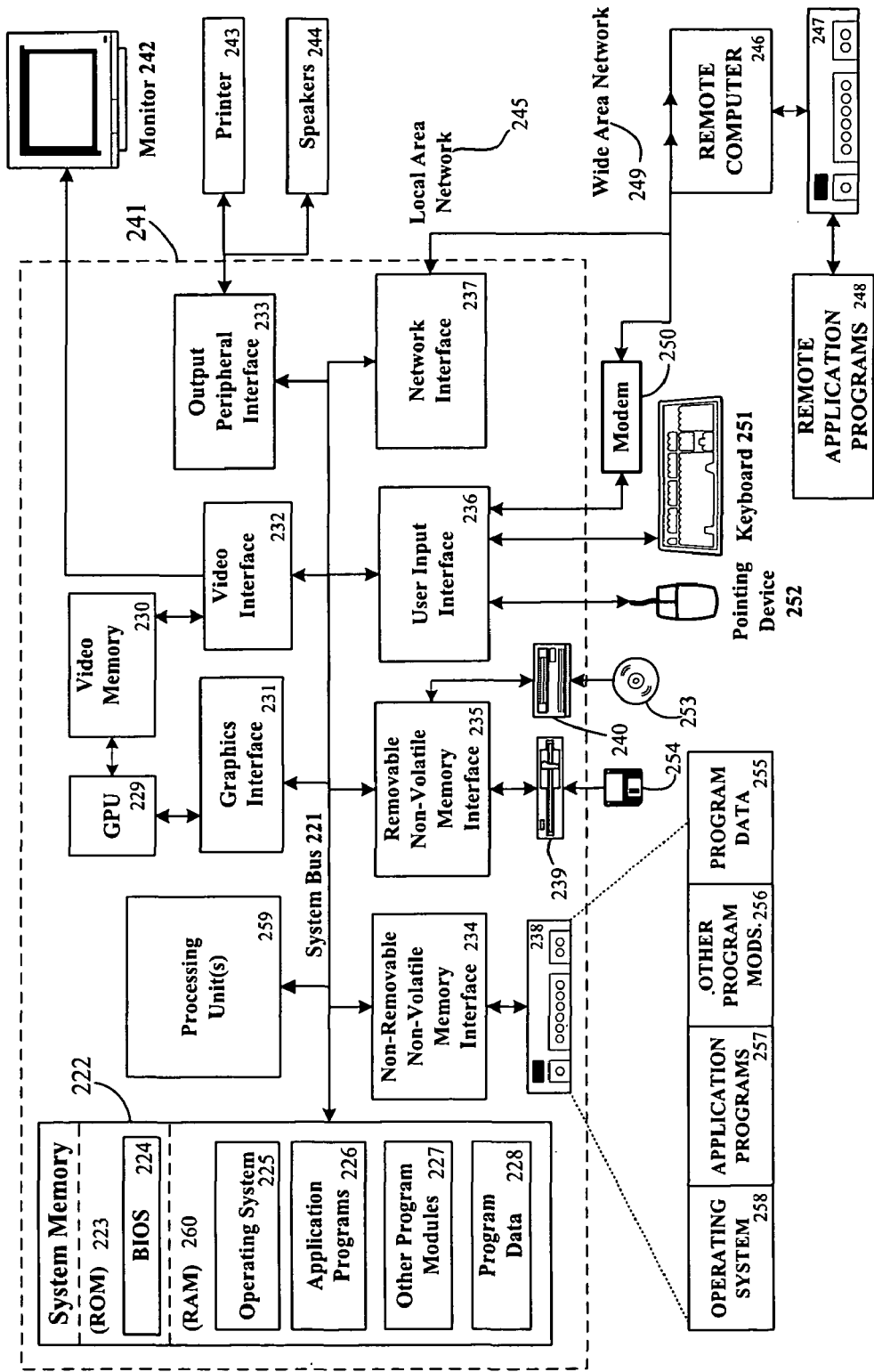
FIG. 1 is a block diagram representing an exemplary computing device suitable for use in conjunction with implementing systems and methods for binarization of an image.

Referring next to FIG. 1, shown is a block diagram representing an exemplary computing device suitable for use in conjunction with implementing the processes described below. For example, the computer-executable instructions that carry out the processes and methods for binarization of an image may reside and/or be executed in such a computing environment as shown in FIG. 1. The computing environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary computing environment 220. For example a computer game console may also include those items such as those described below for use in conjunction with implementing the processes described below.

Aspects of the embodiments are operational with numerous other general purpose or special purpose computing environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, a graphics interface 231, a graphics processing unit (GPU), video memory 229, and a system bus 221 that couples various system components including the system memory 222 to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared and other wireless media. Combinations of the any of the above should also be included within the scope of computer readable media.

The system memory 222 includes computer storage media in the form of volatile and/or nonvolatile memory such as ROM 223 and RAM 260. A basic input/output system (BIOS) 224, containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1 provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device 247. By way of example, and not limitation, FIG. 1 illustrates remote application programs 248 as residing on the remote memory storage device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an application programming interface (API), reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
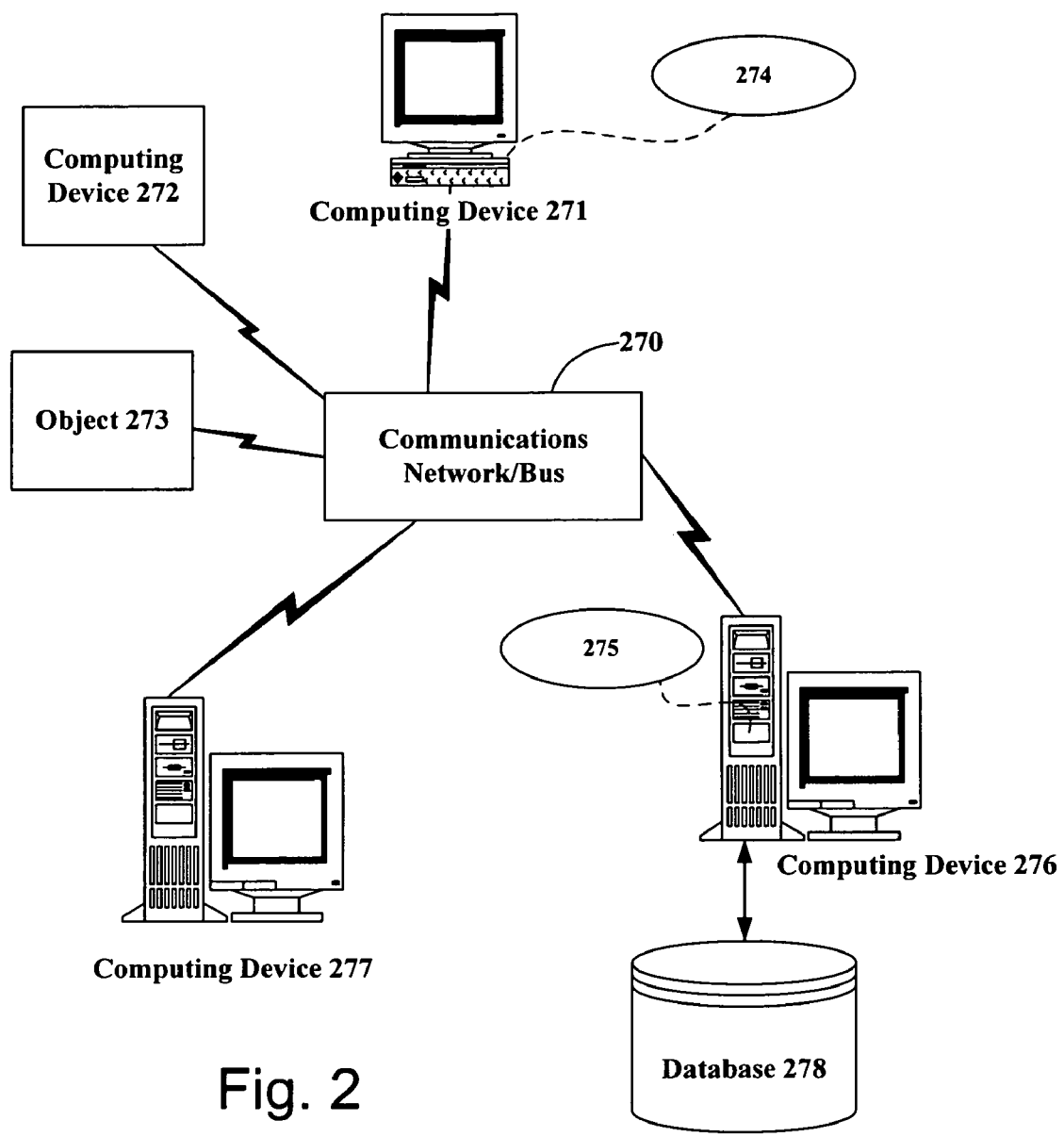
FIG. 2 illustrates an exemplary networked computing environment in which many computerized processes may be implemented to perform binarization of an image.

Referring next to FIG. 2, shown is an exemplary networked computing environment in which many computerized processes may be implemented to perform the processes described below. For example, parallel computing may be part of such a networked environment with various clients on the network of FIG. 2 using and/or implementing processes for binarization of an image. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

Figure 3:
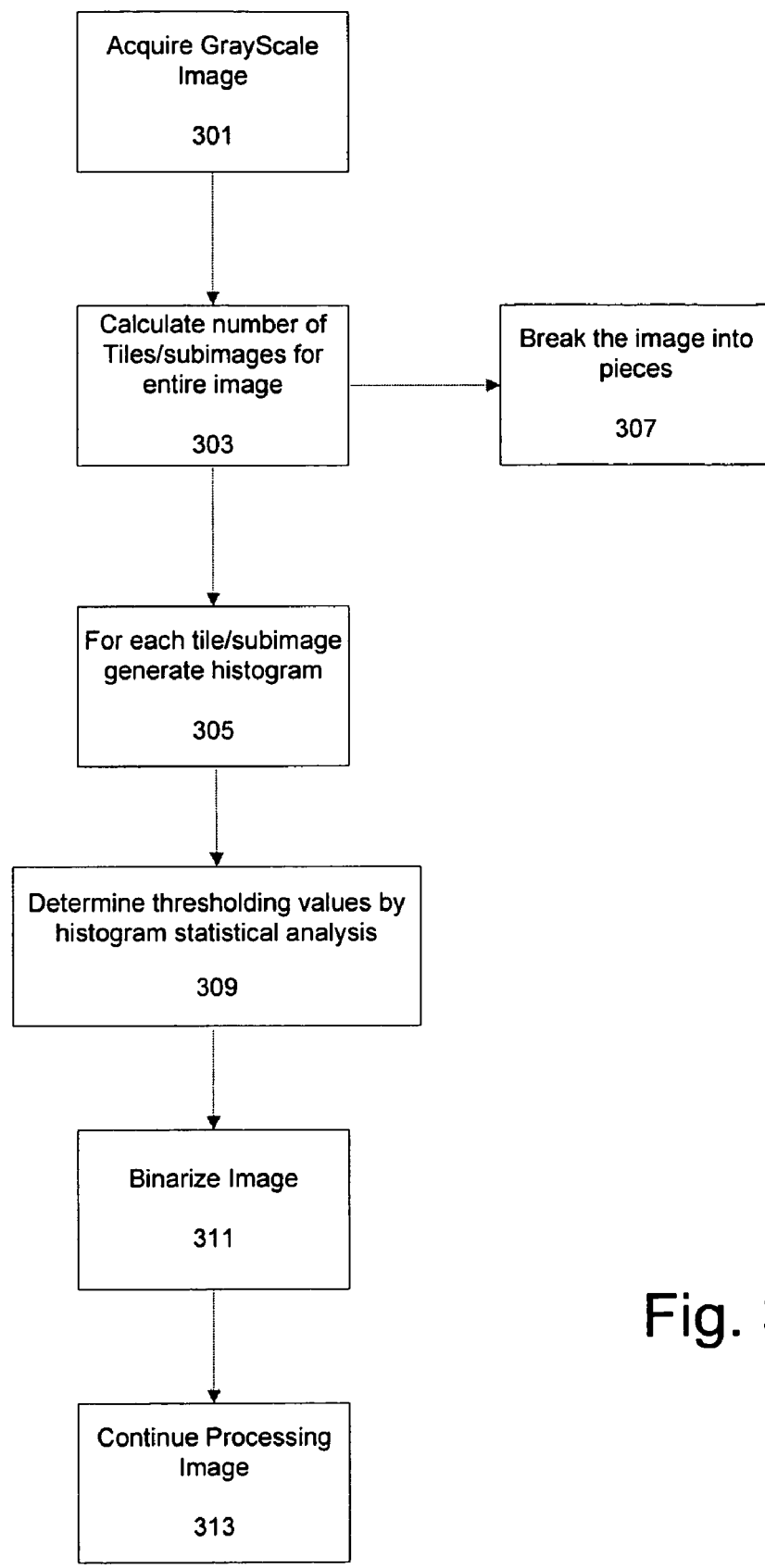
FIG. 3 is a flow chart illustrating an example overall process for binarization of an image.
Figure 4:
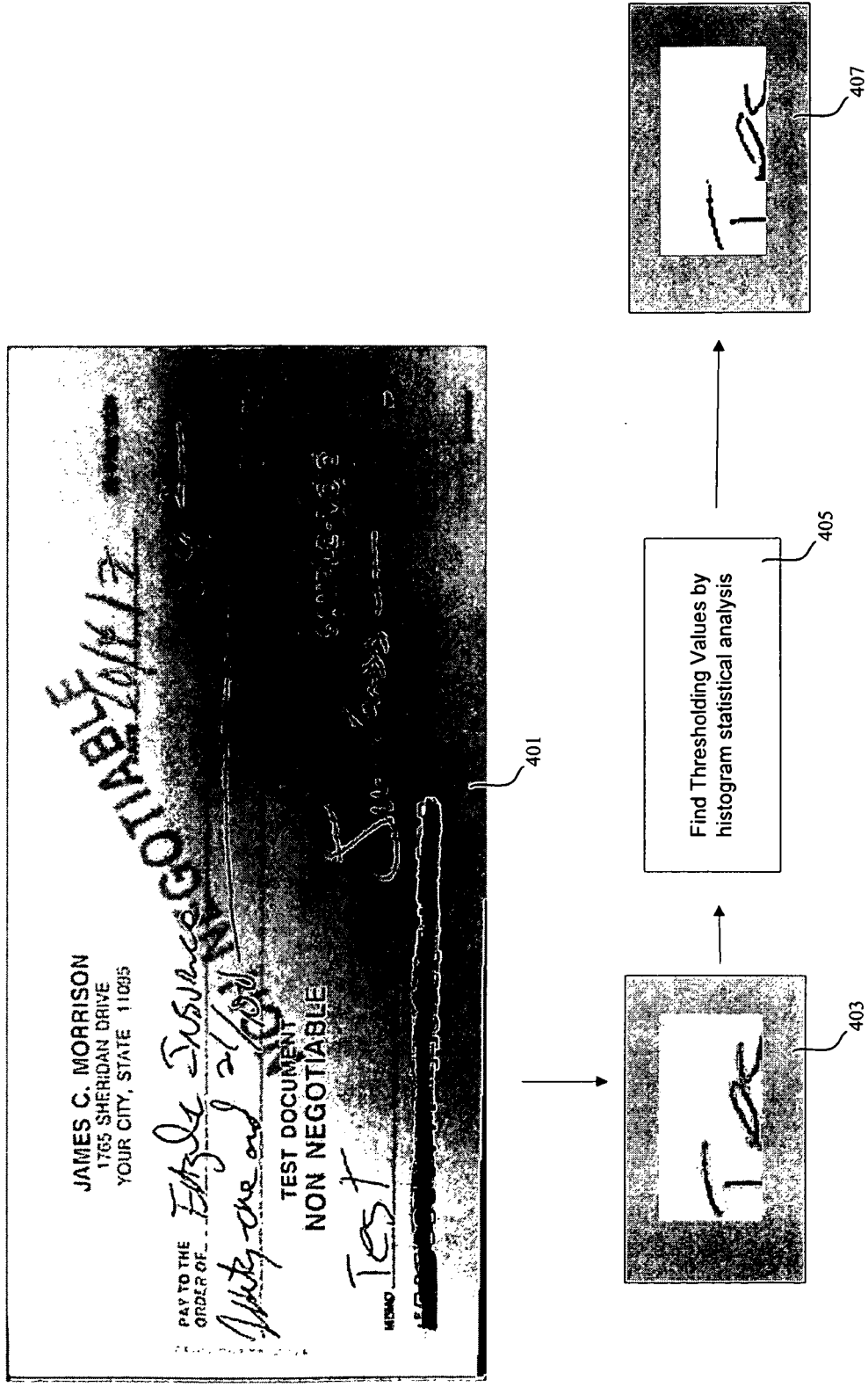
FIG. 4 is a flow chart showing an example image to binarize and an example portion of the image before binarization and after binarization.
Figure 5:
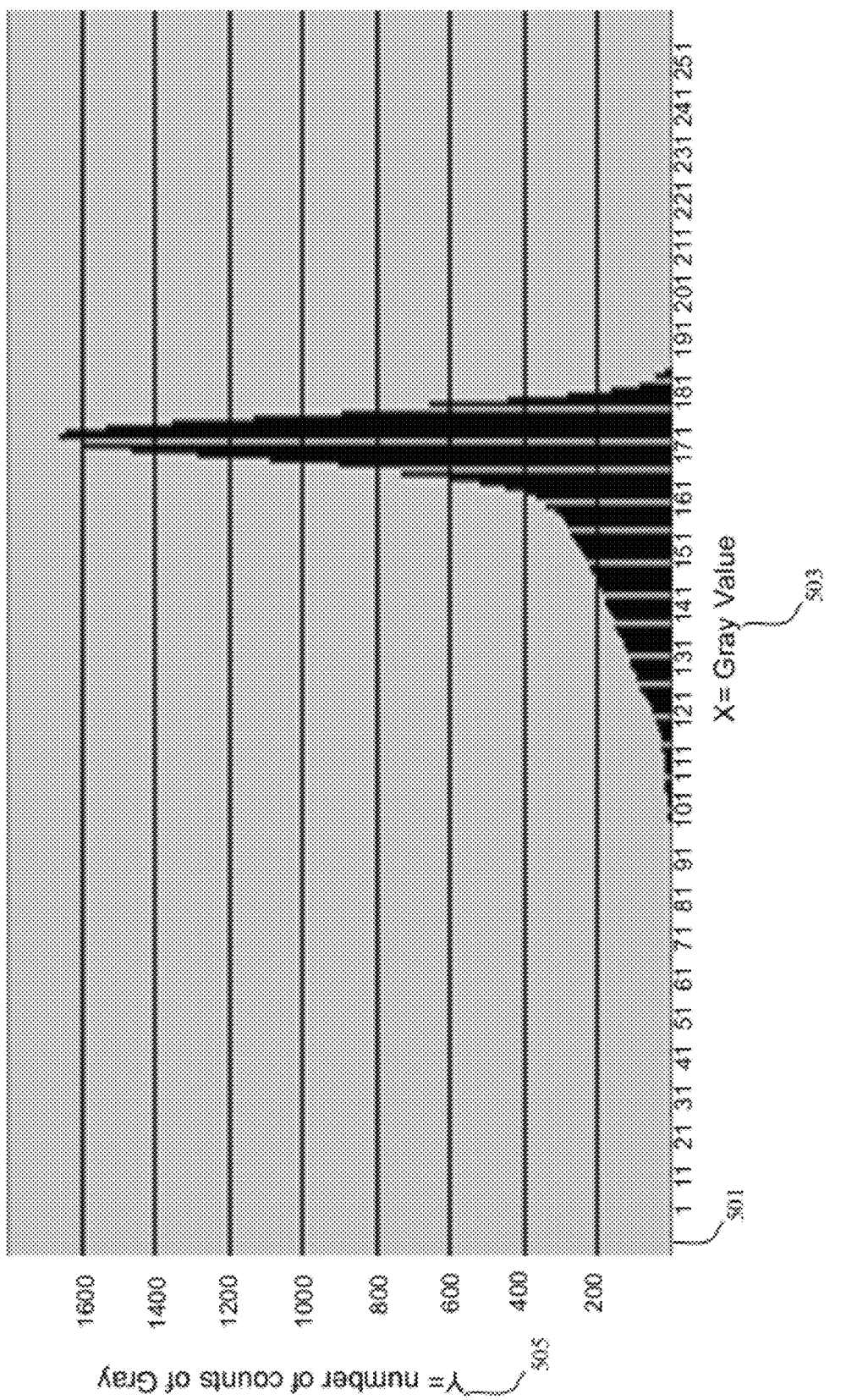
FIG. 5 is an example histogram chart of a sub-image of an image to binarize.
Figure 6:
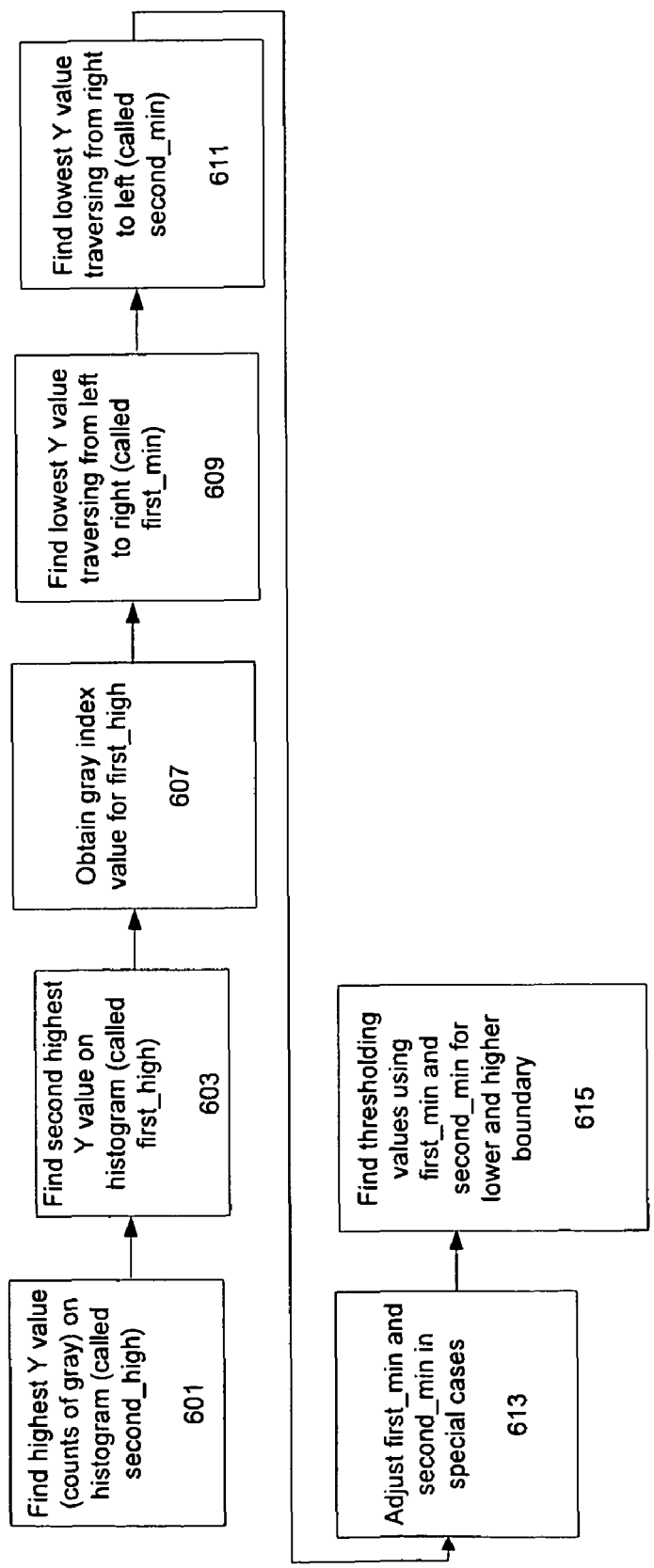
FIG. 6 is a flow chart illustrating an example process for determining threshold values for binarization of an image.

Referring next to FIGS. 3 and 4, shown are a flow chart illustrating an example overall process for binarization of an image and a flow chart showing an example image to binarize and an example sub-image of the image before binarization and after binarization. First, an entire grayscale image 401 is acquired (301). The example image shown in FIG. 4 is that of a personal check. The image may be acquired by use of a scanner (such as a home scanner) or digital camera, for example. Then the number of tiles/sub-images 403 that the image 401 will be broken down into is calculated 303 and the image 401 is broken down (307) into those sub-images. An example sub-image 403 of the example image 401 before binarization is shown on FIG. 4. For example, the example sub-image 403 was taken at pt 100,350 of the check image 401 with a width of 100 and height of 50. The number of sub-images may vary. However, the more sub-images that are used, generally, the better the resulting binarized image will be. For each sub-image, a histogram is then generated (305). Referring next additionally to FIG. 6, shown is an example histogram chart 501 of a sub-image of an image to binarize. The X axis 503 is the gray value and the Y axis 505 is the number of counts of gray.

Thresholding values for image binarization are then determined (309) (405) using statistical analysis of the histogram 501. The image 401 is then binarized 311 by using the determined threshold values for each sub-image to binarize the entire image. An example of a resulting binarized sub-image 407 is shown in FIG. 4. Once the image 401 is binarized, then further processing of the image may be performed such as optical character recognition, etc. For example, once the check image 401 is binarized, information such as the magnetic ink character recognition (MICR) characters and the written amount of the check may be more easily recognized and read from the image 401.

Referring next to FIG. 6, shown is a flow chart illustrating an example process for determining threshold values for binarization of an image. First, the point having the highest Y value (counts of gray) on the histogram is found. This point is called second_high for the present example since it was noticed that there is a pattern among check images that there are usually at least two peaks. However, that that is not always the case. Then the process proceeds to find the point on the histogram having second_highest Y value. This point is called first_high for the present example. In theory, first_high is the first_high value on the left of the histogram before the second_high. The indexed gray value is also tracked for these high values first_high and second_high.

First_high is found by going from left to right on the histogram and comparing the number of counts (Y) of each indexed value (X) to the previous value until the reaching a right X limit. This is started with a maximum value number of gray level counts being the gray level count Y at point [0][0] of the histogram. [0][0] point of the histogram may be also known as the number of gray value counts for gray value zero. The right X limit going from left to right is set to the Mode 'M' unless the second_high X value is less than the Mode 'M'. In which case, the right traversing limit becomes second_high. The first_high gray index X value is then obtained. For discrete distributions, the mode is the value with the greatest frequency and for continuous distributions, it is the point where the probability density is at a maximum. It is possible for a distribution to have two or more modes.

Next the lowest Y value traversing from left to right (called first_min) is found (609) on the histogram. Also, the lowest Y value traversing from right to left (called second_min) is found (611). The process for finding first_min and second_min is similar in procedure to finding first_high and second_high with the exception that the process looks for the minimum value traversing from left to right on the histogram bounded by the first_high and the mode 'M' looking for the lesser Y number of the next value. The resulting point found is called first_min. first_min may be set to 0 by default. If nothing is found, the index gray value is at point [0] [0] or the gray value count for gray value zero (black). The process then finds second_min, but this time traversing from right to left on the histogram bounded by first_min and second_high and starting at second_high. The process determined whether the next number is smaller than the current number at hand to find the minimum value. This results in second_min.

first_min and second_min are then adjusted (613) in special cases. One case is that sometimes first_min and second_min are the same number. In this case, the process checks if the second_min is greater than a Boundary 1 'B1'. Boundaries B1 and B2 are calculated such that B1 is the boundary of data encompassing most of the histogram past a certain noticeable magnitude of order in gray value counts and B2 is the boundary of the histogram such that noticeable magnitudes of order converge to tiny count or zero from the histogram as it approaches 255. It is conceivable that the image boundaries may be 0 and 255 if there exists a full gray value usage for a given image. This is unlikely. If the image tiled into pieces, it most likely result in a subset of the full 255 gray values that contain gray value counts. If the second_min is greater than a Boundary 1 'B1', which most likely is the case, second_min is reset to be the result of the difference of second_min minus my standard deviation times a scaling constant 'k'. In this case, a recommended scaling constant is k=0.3. Thus, the adjusted second_min would be (second- _min−(Q*0.3)). The first_min then becomes boundary 1 (B1). The next special case is when first_min is equal to a number greater than zero and second_min returns empty or by default is 0. In this case, second_min now becomes first_min and first_min is set. Then the process subtracts the standard deviation multiplying by a scaling constant k. In this case, a recommended scaling constant is k=1.

Example software code to find and set the first_min and second_min values appears below:

```
public class MyImageTests
{
    private static void printHistoStat(Histogram histogram)
    {
    System.out.print("Bands:"+histogram.getNumBands( )"\n");
    System.out.print("Low: {");
    for(int j=0; j<histogram.getNumBands( ); j++)
    {
        System.out.print(histogram.getLowValue(j));
        System.out.print(",");
    }
    System.out.print("}\n");
    System.out.print("High: {");
    for(int j=0; j<histogram.getNumBands( ); j++)
    {
        System.out.print(histogram.getHighValue(j));
        System.out.print(",");
    }
    System.out.print("}\n");
    System.out.print("\nEntropy: {");
    for(int j=0; j<histogram.getNumBands( ); j++)
    {
        System.out.print(+histogram.getEntropy( )[j]);
        System.out.print(",");
    }
    System.out.print("}\n");
    System.out.print("\nMax Entropy Threshold: {");
    for(int j=0; j<histogram.getNumBands( ); j++)
    {
        System.out.print(+histogram.getMaxEntropyThreshold( )[j]);
        System.out.print(",");
    }
    System.out.print("}\n");
    System.out.print("\nMean: {");
    for(int j=0; j<histogram.getNumBands( ); j++)
    {
        System.out.print(+histogram.getMean( )[j]);
        System.out.print(",");
    }
    System.out.print("}\n");
    System.out.print("\nMax Variance Threshold: {");
    for(int j=0; j<histogram.getNumBands( ); j++)
    {
        System.out.print(+histogram.getMaxVarianceThreshold( )[j]);
        System.out.print(",");
    }
    System.out.print("}\n");
    System.out.print("\nMode Threshold: {");
    for(int j=0; j<histogram.getNumBands( ); j++)
    {
        System.out.print(+histogram.getModeThreshold(2)[j]);
        System.out.print(",");
    }
    System.out.print("}\n");
    System.out.print("\nMoment: {");
    for(int j=0; j<histogram.getNumBands( ); j++)
    {
        System.out.print(+histogram.getMoment(1,true,false)[j]);
        System.out.print(",");
    }
    System.out.print("}\n");
    System.out.print("\nDeviation: {");
    for(int j=0; j<histogram.getNumBands( ); j++)
    {
        System.out.print(+histogram.getStandardDeviation( )[j]);
        System.out.print(",");
    }
    System.out.print("}\n");
    System.out.print("\ngetNumBins: {");
    for(int j=0; j<histogram.getNumBands( ); j++)
    {
        System.out.print(+histogram.getNumBins( )[j]);
        System.out.print(",");
    }
    System.out.print("}\n");
    System.out.print("\ngetBins: {");
    for(int j=0; j<256; j++)
    {
        System.out.print(+histogram.getBins( )[0][j]);
        System.out.print("\n");
    }
    System.out.print("}\n");
}
private static int[ ] findHistExtremaLows(Histogram histogram, int numberBins)
{
    int [ ][ ] histoBins=histogram.getBins( );
    int max=0;
    int low=0;
    int i=0;
    int flag=0;
    int[ ] highs=new int[2];
    int[ ] lows=new int[2];
    int numb=histoBins[0] [i];
    int holder;
    int q=0;
    int first_min=0;
    low=numb;
    int j=−1;
    do {
        numb=histoBins[0][i+1];
        if(numb>histoBins[0][i]&&numb>max)
        {
            max=numb;
            j=i;
            j++;
        }
        //q=i;
        while(numb==histoBins[0][i]&&numb==max&&
            (i+1)<histoBins.length)
        {
            numb=histoBins[0][i+1];
            i++;
            q++;
        }
```

```
        if(j>0)
        {
            j+=(q/2);
            q=0;
        }
        i++;
    }while(i<numberBins-1);
    highs[0]=j;
    int second_high j;
    //System.out.println("\n\n    second_high:"+second_high);
    numb=histoBins[0][i];
    //System.out.print("\nMode:"+histogram.getModeThreshold(2)[0]);
    max=histoBins[0] [0];
    j=0;
    int limit=(int) histogram.getModeThreshold(2)[0];
    if(second_high<histogram.getModeThreshold(2)[0])
    {
        limit=second_high;
    }
    for(i=0;i<limit;i++)
    {
        numb=histoBins[0][i+1];
        if(numb>=histoBins[0][i]&&numb>max)
        {
            max=numb;
            j=i;
            j++;
        }
        while(numb==histoBins[0][i]&&numb==max)
        {
            numb=histoBins[0][i+1];
            i++;
            q++;
        }
        if(j>0)
        {
            j+=(q/2);
            q=0;
        }
    }///i++;
}
int first_high j;
//System.out.println("\n\n first_high:"+(first_high));
if(first_high>=histogram.getModeThreshold(2)[0])
{
    first_high=(int) histogram.getModeThreshold(2)[0];
}
int min=histoBins[0] [first_high];
int empty_flag=0;
if(second_high<0)
{
    second_high=100;
    empty_flag=1;
}
    for(i=first_high;i<second_high&&i<numberBins-1;
        i++)
    {
        numb=histoBins[0][i+1];
        if(numb<=histoBins[0][i]&&numb<min)
        {
            min=numb;
            j=i;
            j++;
        }
        while(numb==histoBins[0][i]
            &&numb==min&&numb<min)
        {
            numb=histoBins[0][i+1];
            i++;
            q++;
        }
        if(j>0)
        {
            j+=(q/2);
            q=0;
        }
    }
    if(empty_flag==1)
    {
        second_high=0;
    }
    first_min j;
    //System.out.println("\n\n first_min:"+(first_min));
    j=0;
    min=histoBins[0][second_high];
    for(i=second_high;i>first_min;i--)
    {
        numb=histoBins[0][i-1];
        if(numb<histoBins[0][i]&&numb<min)
        {
            min=numb;
            j=i;
            j--;
        }
        while(numb==histoBins                [0]
            [i]&&numb==min&&numb<min)
        {
            numb=histoBins[0][i-1];
            i--;
            q--;
        }
        if(j>0)
        {
            j+=(q/2);
            q=0;
        }
    }
    int second_min j;
    //System.out.println("\n\n   second_min:"+(second_min));
    lows[0]=first_min;
    lows[1]=second_min;
        //i will be first boundary
        return lows;
}
public static RenderedImage readTiled(File f, int tile-
    Width, int
    tileHeight) {
    ImageInputStream iis=
    null;
    try
    {
        iis=ImageIO.createImageInputStream(f);
    }
    catch (IOException e)
    {
        // TODO Auto-generated catch block
        e.printStackTrace( );
    }
    ParameterBlockJAI pbj=new ParameterBlockJAI
        ("ImageRead");
```

```
    ImageLayout layout=new ImageLayout( );
    layout. setTileWidth(tileWidth);
    layout. setTileHeight(tileHeight);
    RenderingHints  hints=new  RenderingHints
        (JAI.KEY_IMAGE_LAYOUT, layout);
    pbj.setParameter("Input", iis);
    return JAI.create("ImageRead", pbj, hints);
    }
static  BufferedImage  convertImage(BufferedImage
    image) {
    BufferedImage newImage=new BufferedImage(im-
        age.getWidth( ) image.getHeight( ),
        BufferedImage.TYPE_3BYTE_BGR);
    Graphics2D g=newImage.createGraphics( );
    g. drawRenderedImage(image, null);
    g.dispose( );
    return newImage;
}
public static void main(String[ ] args)
{
    String input1=null;
    //int numb=888891210;
    //int numb=888891308;
    //int numb=888891230;
    int k=0;
    /*input directory*/
    String directory="directory1";
    /*outputDirectory*/
    String folder="directory2";
    File dir=new File(directory);
    String[ ] children=dir.list( );
    if (children==null)
    {
        System.out.print("Empty Directory\n");
        // Either dir does not exist or is not a directory
            return;
    }
    else
    {
        for (int i=0; i<children.length; i++)
            //for (int i=0; i<2; i++)
        {
            // Get filename of file or directory
            String filename=children[i];
            int    startTime=(int)   System.currentTime-
            Millis( );
            k++;
            System.out.print("\n"+k);
            input1=directory+children[i];
            String myimage=children[i];
            String file=folder+myimage;
            int pos=myimage.lastIndexOf('.');
            String ext=myimage.substring(pos+1);
            ext=ext.toLowerCase( )
            boolean exists=(new File(input1)).exists( );
            if (exists && (ext.equals("jpg")))
            {
                BufferedImage image=null;
                BufferedImage holder=null;
                BufferedImage virtimage=null;
                CornerXY edges=null;
                int[ ] pixels=null;
                try
                {
                    image=ImageIO.read(new File(input1));
                }
                catch (IOException e)
                {
                    // TODO Auto-generated catch block
                    e.printStackTrace( );
                }
                //BufferedImage
                newImage=Warp.FixTrapImageOnDarkBack-
                ground(image);       SquareDim
                dims=FixFoldedImages.calculateDimension-
                OfSquares(image.getWidth(    ),image.
                getHeight( ),10,10);
                int width=dims.getXPixels( );
                int height=dims.getYPixels( );
                System.out.print(""+children[i]+"xPixels:"+
                dims.getXPixels( )+" yPixels:"+dims.getYPix-
                els( )"\n");
                //BufferedImage img1=image.getSubimage(85,
                385,267,99);//0.0.28.20//93.491.100.62
                BufferedImage
                img1=ImageManipulation.cropBufferedImage
                (100,50,(int)(100),(int)(350),image);
                // TiledImage tiledImage=new TiledImage(sub,
                sub.getWidth( ),sub.getHeight( );//Constructs a
                TiledImage equivalent to a given RenderedIm-
                age but with specific tile dimensions.
                //     tiledImage.setData(image.copyData
                (sub.getAlphaRaster( ));
                //                WritableRaster
                tester=tiledImage.getWritableTile(0,0);
                // BufferedImage img1=new BufferedImage
                (image.getColorModel( ),tester, true, null);
                double[         ][            ]
                answer=ImageAnalysis.findExtrema(img1,1,
                1);
                for(int q=0;q<answer.length;q++)
                {
                System.out.print("Extrema["+q+"]"+"[0]:
                "+answer[q][0]+"\n");
                }
                // System.out.print("nTileWidth Piece: "+tiled-
                Image.getTile(0,0).getWidth( )+"\n");
                //System.out.print("\nTilexX:      "+tiledIm-
                age.getMaxTileX( )"TileY: "+tiledImage.get-
                MaxTileY( )+"\n");
                Histogram
                histogram=ImageAnalysis.getHistogram2(Pla-
                narImage.wrapRenderedImage(img1));
                //printHistoStat(histogram);
                //Histogram
                histogram2=ImageAnalysis.getHistogram2
                (PlanarImage.wrapRenderedImage(image));
                //printHistoStat(histogram2);
                Histogram histogram3=histogram.getSmoothed
                (true,6); printHistoStat(histogram3);
                int [ ] lows=findHistExtremaLows(histogram3,
                256);
                System.out.printrn      \nLow1:"+lows[0]+"
                \tLow2:"+lows[1]);
                if(lows [0] !=0&&lows [1]==0)
                {
                lows[1]=(int)              (lows[0]-
                histogram3.getStandardDeviation( )[0]);
                lows[0]=(int) answer[0][0];
                }
                if(lows[1]==0)
                {
                lows[1]=256;
                }
                if(lows[0]==lows[1]&&lows[1]>answer[0][0])
```

```
{
lows[0]=(int) answer[0][0];
lows[1]=(int)            (lows[1]–
0.3*histogram3.getStandardDeviation( )[0]);
}
int level=lows[0];
int
number=ImageAnalysis.getBlackPixelCount
(img1,level);
System.out.print("\n\nNumber of dark Pixels
smaller than "+level+": "+number+"\n");
//ImageAnalysis.saveImage(img1,
"C:\\Temp\\tester\\myimage.jpg");
BufferedImage newimage=new BufferedImage
(img1.getWidth( ), img1.getHeight( ), Buffered-
Image. TYPE_BYTE_GRAY);
newimage.setData(img1.getData( );
BufferedImage subImage, tempImage;
// get reference to the sub-image you want:
tempImage=img1.getSubimage    (0,    0,
img1.getWidth( ), img1.getHeight( ));
//ImageAnalysis.saveImage(tempImage,    "C:
\\Temp\\tester\\temp.jpg");
// copy the contents of this sub-image:
WritableRaster wr=tempImage.copyData(tem-
pImage.getRaster( ));
// create new image.
subImage=new BufferedImage ((int)(267), (int)
(99), BufferedImage.TYPE_BYTE_GRAY);
// . . . and fill it with the contents of the extracted
sub-image:
subImage.setData (wr);
// voila. your copy is now in subImage.
//low[0]=133;
// high[0]=135;
System.out.print("Lows1: "+lows[0]+"\tlows2:
"+lows[1]+"\n");
// BufferedImage test=convertImage(subImage)
.getSubimage(0);
BufferedImage img2=
null;
if(img1!=null)
{
PlanarImage clamp=FilterAndStoreTest.clamp
(PlanarImage.wrapRenderedImage(img1), lows
[0], lows[1]);
//PlanarImage invert=FilterAndStoreTest.invert
(clamp);
PlanarImage                            binarize
front=FilterAndStoreTest.binarize(clamp,Bina-
rizeFilter.PTILE, 0.7);
img2=binarize front.getAsBufferedImage( );
//                             BufferedImage
img2=ImageManipulation.threshold(img1,low,
high,map front);
//ImageAnalysis.saveImage(subImage,
"C:\\Temp\\tester\\subImagejpg");
//ImageAnalysis.saveImage(newimage, "C: \\
Temp\\tester\\newImage.jpg");
//ImageAnalysis.saveImage(img2,
"C:\\Temp\\tester\\threshjpg");
}// BufferedImage newImage=
ImageAnalysis.saveImage(img2, file);
}
}
}
}
}
}
```

Thresholding values are then determined (615) using first_min and second_min for the lower and higher boundaries. To do this, an image processing clamp method is called with input as the boundary gray level values first_min and second_min. The clamp function may be defined as:

```
int clamp(int x, int low, int high) {
  return (x<low) ? low: ((x>high) ? high: x);
}
```

Known binarization methods may then be used with the resulting image of the clamp process as input. The resulting image is a binarized (generally black and white pixel) image. Thus, the overall image is binarized based on the uniqueness of each of the sub-images processed. The current sub-image thresholding values are based on the processes described above to find the values to improve the image quality for the next stages of image processing.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although embodiments been described herein with reference to particular means, and materials, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

The invention claimed is:

1. A system for processing an image for binarization comprising:
   a memory; and
   a processor configured to execute instructions stored in the memory to:
      break the image into multiple sub-images;
      generate a histogram for a sub-image among the multiple sub-images; and
      determine a thresholding value for image binarization by statistical analysis of the histogram for the sub-image, where determining the thresholding value comprises performing an image processing clamp method on the sub-image to find the thresholding value, with input to the clamp method being boundary gray level values determined from statistical analysis of the histogram of the sub-image.

2. The system of claim 1 where the processor is further configured to execute instructions stored in the memory to:
   find a highest Y axis value on the histogram, denoted as second_high herein, wherein a Y axis on the histogram is counts of gray and an X axis on the histogram is gray value;
   find a second_highest Y value on the histogram, denoted herein as first_high;
   obtain a gray index value of the first_high;

find a lowest Y value traversing from left to right on the histogram, denoted as first_min herein, using the first_high and a calculated value as boundaries;
find a lowest Y value traversing from right to left on the histogram, denoted as second_min herein, using the first_min and the second_high as boundaries; and
where the input to the clamp method is boundary gray level values of the first_min and the second_min.

3. The system of claim 2 wherein the processor is further configured to execute instructions stored in the memory to binarize the sub-image using the thresholding value of the clamp method as input.

4. The system of claim 1 where the processor is further configured to execute instructions stored in the memory to binarize the sub-image using the determined thresholding value.

5. The system of claim 1 where the processor is further configured to execute instructions stored in the memory to:
binarize the multiple sub-images using determined thresholding values; and
put the binarized multiple sub-images back together to create a single binarized image.

6. The system of claim 5 where the processor is further configured to execute instructions stored in the memory to use the single binarized image to read characters on the single binarized image.

7. A method for processing an image for binarization comprising:
breaking the image into multiple sub-images;
generating a histogram for a sub-image among the multiple sub-images; and
determining a thresholding value for image binarization by statistical analysis of the histogram for the sub-image, where determining the thresholding value comprises performing an image processing clamp method on the sub-image to find the thresholding value, with input to the clamp method being boundary gray level values determined from statistical analysis of the histogram of the sub-image.

8. The method of claim 7 wherein the determining the thresholding value comprises:
finding a highest Y axis value on the histogram, denoted as second_high herein, wherein a Y axis on the histogram is counts of gray and an X axis on the histogram is gray value;
finding a second_highest Y value on the histogram, denoted herein as first_high; obtaining a gray index value of the first_high;
finding a lowest Y value traversing from left to right on the histogram, denoted as first min herein, using the first_high and a calculated value as boundaries;
finding a lowest Y value traversing from right to left on the histogram, denoted as second_min herein, using the first_min and the second_high as boundaries; and
where the input to the clamp method is boundary gray level values of the first_min and the second_min.

9. The method of claim 8 further comprising binarizing the sub-image using the thresholding value of the clamp method as input.

10. The method of claim 7 further comprising binarizing the sub-image using the determined thresholding value.

11. The method of claim 7 further comprising:
binarizing the multiple sub-images using determined thresholding values; and
putting the binarized multiple sub-images back together to create a single binarized image.

12. The method of claim 11 further comprising using the single binarized image to read characters on the single binarized image.

13. A non-transitory computer readable medium for processing an image for binarization comprising computer readable instructions for:
breaking the image into multiple sub-images;
generating a histogram for a sub-image among the multiple sub-images; and
determining a thresholding value for image binarization by statistical analysis of the histogram for the sub-image, where determining the thresholding value comprises performing an image processing clamp method on the sub-image to find the thresholding value, with input to the clamp method being boundary gray level values determined from statistical analysis of the histogram of the sub-image.

14. The non-transitory computer readable medium of claim 13 wherein the computer readable instructions for determining the thresholding value comprise computer readable instructions for:
finding a highest Y axis value on the histogram, denoted as second_high herein, wherein a Y axis on the histogram is counts of gray and an X axis on the histogram is gray value;
finding a second_highest Y value on the histogram, denoted herein as first_high;
obtaining a gray index value of the first_high;
finding a lowest Y value traversing from left to right on the histogram, denoted as first_min herein, using the first_high and a calculated value as boundaries;
finding a lowest Y value traversing from right to left on the histogram, denoted as second_min herein, using the first_min and the second_high as boundaries; and
where the input to the clamp method is boundary gray level values of the first_min and the second_min.

15. The non-transitory computer readable medium of claim 14 further comprising computer readable instructions for binarizing the sub-image using the thresholding value of the clamp method as input.

16. The non-transitory computer readable medium of claim 13 further comprising computer readable instructions for binarizing the sub-image using the determined thresholding value.

17. The non-transitory computer readable medium of claim 13 further comprising computer readable instructions for:
binarizing the multiple sub-images using determined thresholding values; and
putting the binarized multiple sub-images back together to create a single binarized image.

18. The non-transitory computer readable medium of claim 13 further comprising computer readable instructions for using the single binarized image to read characters on the single binarized image.

* * * * *